US012581555B2

(12) United States Patent
Tian

(10) Patent No.: US 12,581,555 B2
(45) Date of Patent: Mar. 17, 2026

(54) COMMUNICATION METHOD AND COMMUNICATION SYSTEM

(71) Applicant: Lenovo (Beijing) Limited, Beijing (CN)

(72) Inventor: Xiang Tian, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 597 days.

(21) Appl. No.: 17/693,426

(22) Filed: Mar. 14, 2022

(65) Prior Publication Data

US 2023/0093635 A1     Mar. 23, 2023

(30) Foreign Application Priority Data

Sep. 22, 2021    (CN) .......................... 202111109116.5

(51) Int. Cl.
| | |
|---|---|
| *H04W 76/15* | (2018.01) |
| *H04W 4/80* | (2018.01) |
| *H04W 12/06* | (2021.01) |

(52) U.S. Cl.
CPC ............. *H04W 76/15* (2018.02); *H04W 4/80* (2018.02); *H04W 12/06* (2013.01)

(58) Field of Classification Search
CPC ....... H04W 76/15; H04W 4/80; H04W 12/06;
H04W 84/18; H04W 12/069; H04W 12/12; H04W 12/50; H04W 12/068; H04W 76/14; H04W 76/19; H04W 76/30; H04W 76/23
USPC ......................................................... 455/41.2
See application file for complete search history.

(56) References Cited

U.S. PATENT DOCUMENTS

| | | | | |
|---|---|---|---|---|
| 2012/0214413 A1* | 8/2012 | Rose | ....................... | H04L 63/18 |
| | | | | 455/41.1 |
| 2022/0369394 A1* | 11/2022 | Ni | ........................... | H04W 4/80 |
| 2023/0146095 A1* | 5/2023 | Kim | ....................... | G10L 15/04 |
| | | | | 726/19 |
| 2023/0156838 A1* | 5/2023 | Luo | ....................... | H04W 76/14 |
| | | | | 455/41.2 |

* cited by examiner

*Primary Examiner* — Eugene Yun
(74) *Attorney, Agent, or Firm* — ANOVA LAW GROUP, PLLC

(57) ABSTRACT

A communication method applied to a first electronic apparatus includes, after establishing a communication connection with a second electronic apparatus, obtaining configuration information from the second electronic apparatus, monitoring a communication state between the first electronic apparatus and the second electronic apparatus, and saving or deleting second description information corresponding to the second electronic apparatus based on the configuration information after the first electronic apparatus is disconnected from the second electronic apparatus. The second description information includes information that represents uniqueness of the second electronic apparatus.

16 Claims, 9 Drawing Sheets

After a communication connection is established with a second electronic apparatus, obtain configuration information from the second electronic apparatus — S101

Monitor a communication state between the first electronic apparatus and the second electronic apparatus is monitored, and save or delete second description information corresponding to the second electronic apparatus based on the configuration information after the first electronic apparatus is disconnected from the second electronic apparatus, the second description information at least including information that indicates the uniqueness of the second electronic apparatus — S102

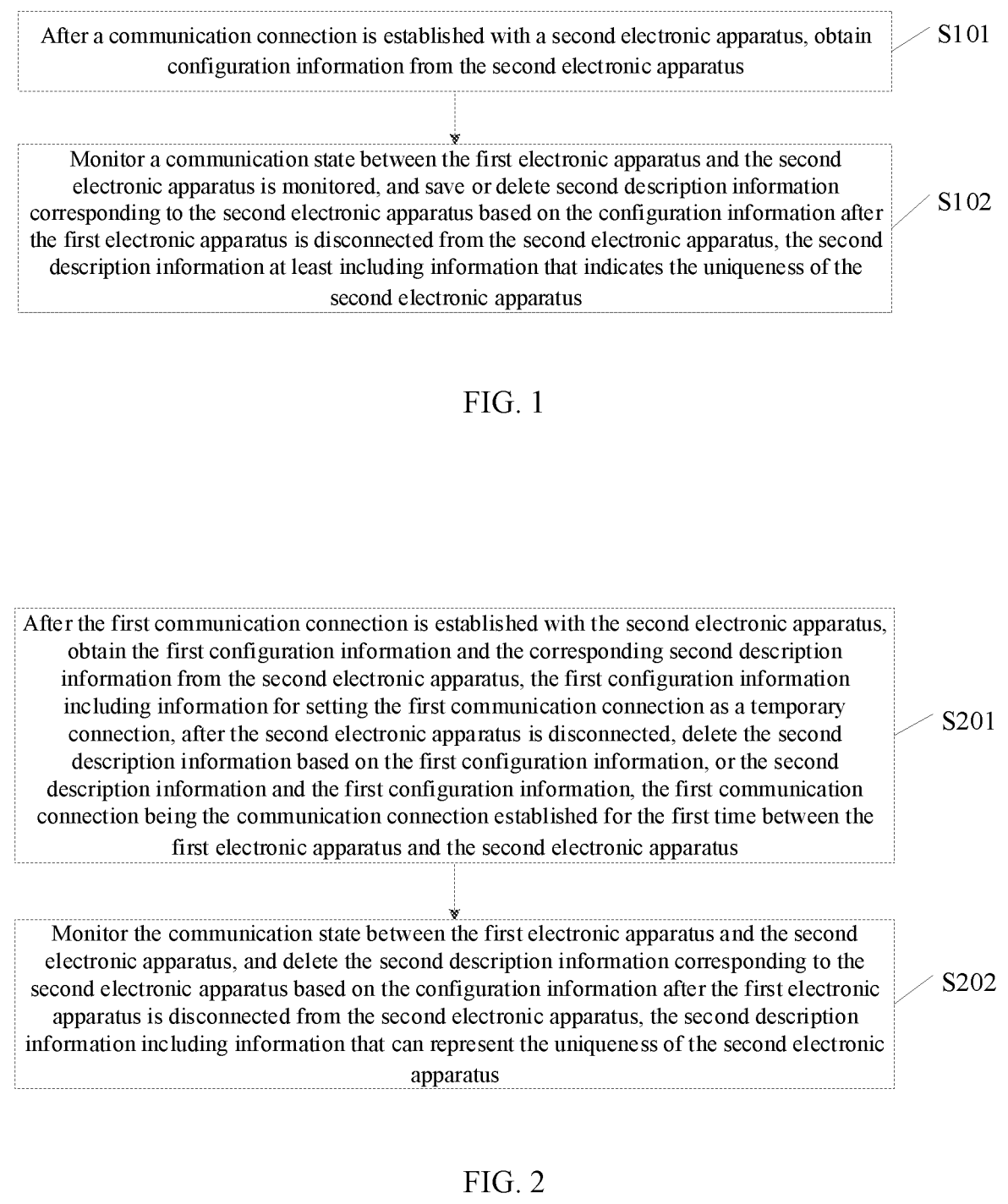

After a communication connection is established with a second electronic apparatus, obtain configuration information from the second electronic apparatus   — S101

Monitor a communication state between the first electronic apparatus and the second electronic apparatus is monitored, and save or delete second description information corresponding to the second electronic apparatus based on the configuration information after the first electronic apparatus is disconnected from the second electronic apparatus, the second description information at least including information that indicates the uniqueness of the second electronic apparatus   — S102

FIG. 1

After the first communication connection is established with the second electronic apparatus, obtain the first configuration information and the corresponding second description information from the second electronic apparatus, the first configuration information including information for setting the first communication connection as a temporary connection, after the second electronic apparatus is disconnected, delete the second description information based on the first configuration information, or the second description information and the first configuration information, the first communication connection being the communication connection established for the first time between the first electronic apparatus and the second electronic apparatus   — S201

Monitor the communication state between the first electronic apparatus and the second electronic apparatus, and delete the second description information corresponding to the second electronic apparatus based on the configuration information after the first electronic apparatus is disconnected from the second electronic apparatus, the second description information including information that can represent the uniqueness of the second electronic apparatus   — S202

FIG. 2

Figures 3, 4:
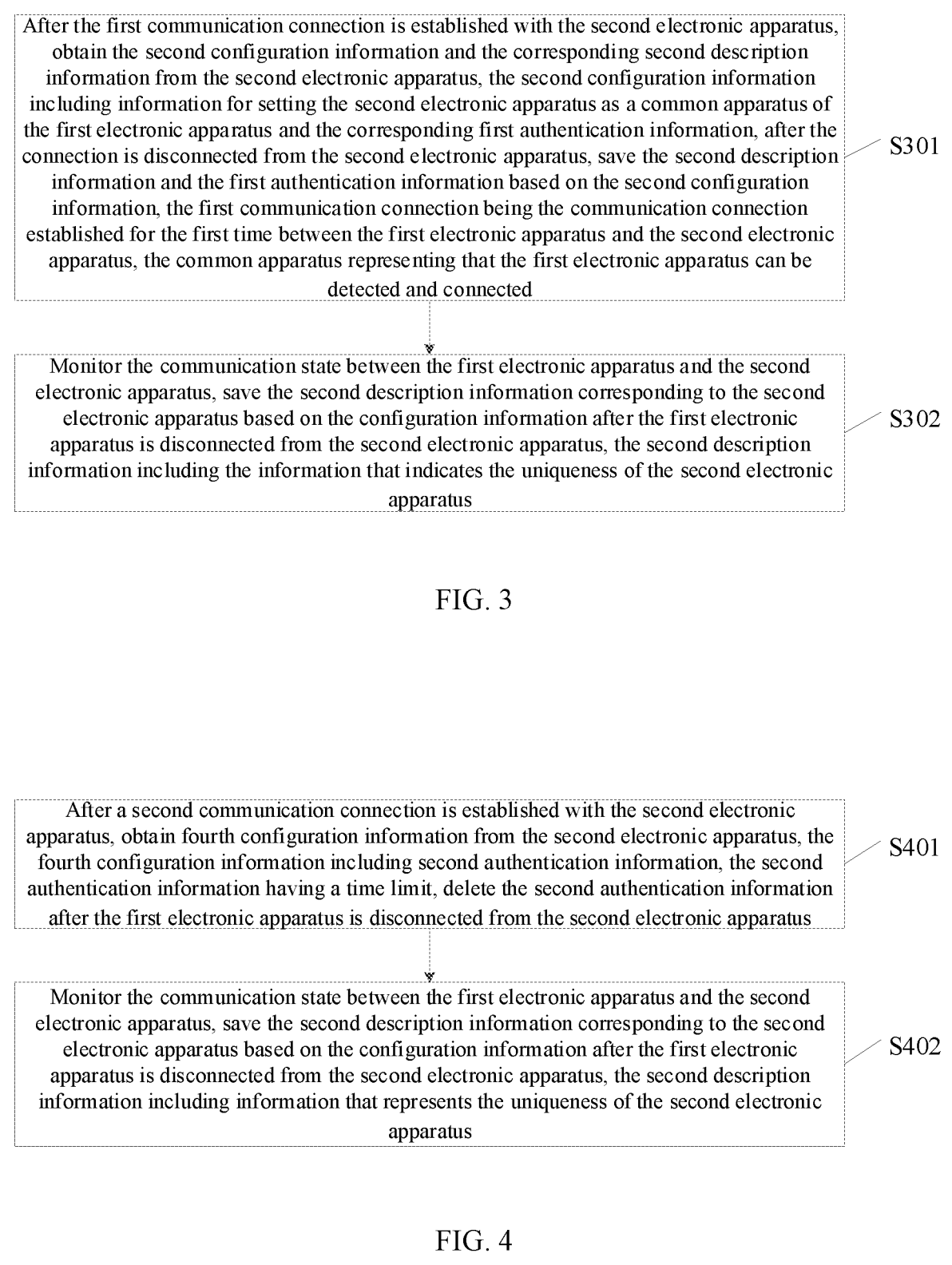

After the first communication connection is established with the second electronic apparatus, obtain the second configuration information and the corresponding second description information from the second electronic apparatus, the second configuration information including information for setting the second electronic apparatus as a common apparatus of the first electronic apparatus and the corresponding first authentication information, after the connection is disconnected from the second electronic apparatus, save the second description information and the first authentication information based on the second configuration information, the first communication connection being the communication connection established for the first time between the first electronic apparatus and the second electronic apparatus, the common apparatus representing that the first electronic apparatus can be detected and connected

S301

Monitor the communication state between the first electronic apparatus and the second electronic apparatus, save the second description information corresponding to the second electronic apparatus based on the configuration information after the first electronic apparatus is disconnected from the second electronic apparatus, the second description information including the information that indicates the uniqueness of the second electronic apparatus

After a second communication connection is established with the second electronic apparatus, obtain fourth configuration information from the second electronic apparatus, the fourth configuration information including second authentication information, the second authentication information having a time limit, delete the second authentication information after the first electronic apparatus is disconnected from the second electronic apparatus

S401

Monitor the communication state between the first electronic apparatus and the second electronic apparatus, save the second description information corresponding to the second electronic apparatus based on the configuration information after the first electronic apparatus is disconnected from the second electronic apparatus, the second description information including information that represents the uniqueness of the second electronic apparatus

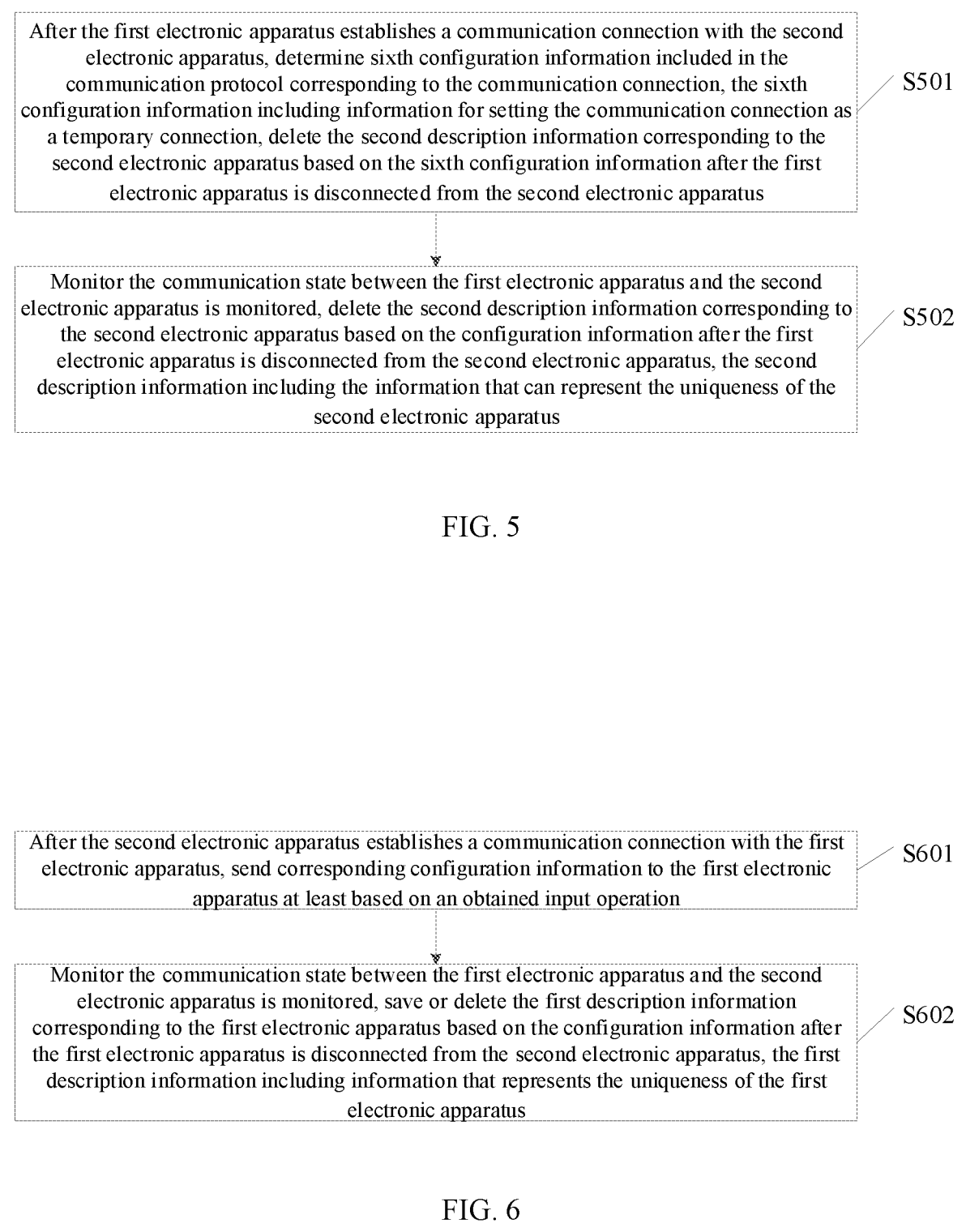

After the first electronic apparatus establishes a communication connection with the second electronic apparatus, determine sixth configuration information included in the communication protocol corresponding to the communication connection, the sixth configuration information including information for setting the communication connection as a temporary connection, delete the second description information corresponding to the second electronic apparatus based on the sixth configuration information after the first electronic apparatus is disconnected from the second electronic apparatus    S501

Monitor the communication state between the first electronic apparatus and the second electronic apparatus is monitored, delete the second description information corresponding to the second electronic apparatus based on the configuration information after the first electronic apparatus is disconnected from the second electronic apparatus, the second description information including the information that can represent the uniqueness of the second electronic apparatus    S502

FIG. 5

After the second electronic apparatus establishes a communication connection with the first electronic apparatus, send corresponding configuration information to the first electronic apparatus at least based on an obtained input operation    S601

Monitor the communication state between the first electronic apparatus and the second electronic apparatus is monitored, save or delete the first description information corresponding to the first electronic apparatus based on the configuration information after the first electronic apparatus is disconnected from the second electronic apparatus, the first description information including information that represents the uniqueness of the first electronic apparatus    S602

FIG. 6

COMMUNICATION METHOD AND COMMUNICATION SYSTEM

CROSS-REFERENCE TO RELATED APPLICATION

This application claims priority to Chinese Patent Application No. 202111109116.5, filed on Sep. 22, 2021, the entire content of which is incorporated herein by reference.

TECHNICAL FIELD

The present disclosure generally relates to the communication technology field and, more particularly, to a communication method and a communication system.

BACKGROUND

The Bluetooth protocol will by default remember information of a last connected apparatus. Thus, the apparatus may be directly connected by default when the apparatus is detected. For example, cellphone A (host apparatus) is often connected to a Bluetooth apparatus (secondary apparatus). Cellphone B is connected through the Bluetooth apparatus, which may be a one-time occurrence. After use, cellphone B is disconnected from the Bluetooth apparatus. Next time, the Bluetooth apparatus is expected to automatically connect to cellphone A instead of cellphone B. However, in the existing technology, the Bluetooth protocol remembers the last connected apparatus by default, that is, the cellphone B.

Therefore, how to solve the above problems has become a research focus for those skilled in the art.

SUMMARY

Embodiments of the present disclosure provide a communication method applied to a first electronic apparatus. The method includes, after establishing a communication connection with a second electronic apparatus, obtaining configuration information from the second electronic apparatus, monitoring a communication state between the first electronic apparatus and the second electronic apparatus, and saving or deleting second description information corresponding to the second electronic apparatus based on the configuration information after the first electronic apparatus is disconnected from the second electronic apparatus. The second description information includes information that represents uniqueness of the second electronic apparatus.

Embodiments of the present disclosure provide a communication method applied to a second electronic apparatus. The method includes, after establishing a communication connection with a first electronic apparatus, sending corresponding configuration information to the first electronic apparatus based on an obtained input operation, monitoring the communication state between the first electronic apparatus and the second electronic apparatus, and saving or deleting the first description information corresponding to the first electronic apparatus based on the configuration information. The first description information includes information that represents uniqueness of the first electronic apparatus.

Embodiments of the present disclosure provide a communication system, including a first electronic apparatus and a second electronic apparatus. After the first electronic apparatus establishes a communication connection with the second electronic apparatus, the second electronic apparatus sends corresponding configuration information to the first electronic apparatus. After the first electronic apparatus is disconnected from the second electronic apparatus, the first electronic apparatus saves or deletes second description information corresponding to the second electronic apparatus based on the configuration information, and/or the second electronic apparatus saves or deletes the first description information corresponding to the first electronic apparatus based on the configuration information. The first description information includes information that represents uniqueness of the first electronic apparatus. The second description information includes information that represents the uniqueness of the second electronic apparatus.

BRIEF DESCRIPTION OF THE DRAWINGS

The following drawings are merely examples for illustrative purposes according to various disclosed embodiments and are not intended to limit the scope of the present disclosure.

FIG. 1 illustrates a schematic flowchart of a communication method according to some embodiments of the present disclosure.

FIG. 2 illustrates a schematic flowchart of another communication method according to some embodiments of the present disclosure.

FIG. 3 illustrates a schematic flowchart of still another communication method according to some embodiments of the present disclosure.

FIG. 4 illustrates a schematic flowchart of still another communication method according to some embodiments of the present disclosure.

FIG. 5 illustrates a schematic flowchart of still another communication method according to some embodiments of the present disclosure.

FIG. 6 illustrates a schematic flowchart of still another communication method according to some embodiments of the present disclosure.

DETAILED DESCRIPTION OF THE EMBODIMENTS

Figure 7A:
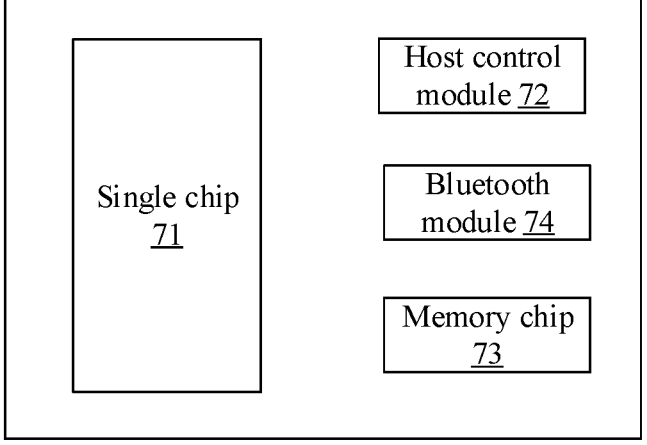
FIG. 7A illustrates a schematic structural diagram showing hardware of a Bluetooth apparatus according to some embodiments of the present disclosure.

The technical solutions of the present disclosure are further described in detail below in connection with the accompanying drawings and embodiments. Apparently, the described embodiments are only some embodiments of the present application, but not all embodiments. Based on embodiments of the present disclosure, all other embodiments obtained by those of ordinary skill in the art without creative work should be within the scope of the present disclosure.

In the following description, the term "some embodiments" describes a subset of all possible embodiments. The term "some embodiments" can be a same sublet or different subsets of all possible embodiments and can be combined with each other when there is no conflict.

In the following description, a suffix such as "module," "component," or "unit" that is used to represent an element is merely used to facilitate the description of the present disclosure and have no specific meaning. Thus, "module," "component," or "unit" may be used interchangeably.

The term "first\second\third" involved in embodiments of the present disclosure is merely used to distinguish similar objects and does not represent a specific order of the objects. For the term "first\second\third," a specific order or sequence may be interchanged. Thus, embodiments of the present disclosure can be implemented in a sequence other than the sequence illustrated or described in the drawings.

In the existing technology, a Bluetooth connection mainly includes the following problems.

(1) The Bluetooth protocol will remember information of a last connected apparatus by default. When the apparatus is detected, the apparatus may be directly connected by default. For example, cellphone A (host apparatus) is often connected to a Bluetooth apparatus (secondary apparatus). Cellphone B may be connected to the Bluetooth apparatus, which may be a one-time connection. After use, cellphone B may be actively disconnected from the Bluetooth apparatus. Next time, the Bluetooth apparatus may be expected to be automatically connected to cellphone A instead of cellphone B. However, the current Bluetooth protocol remembers the last connected apparatus by default, that is, cellphone B.

(2) When a paired host apparatus does not turn on a Bluetooth switch, other surrounding host apparatuses will receive the information of the Bluetooth apparatus.

Thus, the following disadvantages may be caused.

(1) When the host apparatus only needs to be connected to the Bluetooth apparatus once, the host apparatus needs to be disconnected from the Bluetooth apparatus manually and delete the Bluetooth apparatus after use.

(2) In addition to a first connection to the Bluetooth apparatus, to improve the use security of the Bluetooth apparatus, a pairing password needs to be entered for other connections to the Bluetooth apparatus.

(3) Since a function of "only paired apparatus being visible" means that all connected apparatuses are visible, which imposes some security risks.

(4) When the Bluetooth switch of the host apparatus is not turned off, all Bluetooth apparatuses within a communication range will receive apparatus information. A cellphone will pop up a reminder to block a screen of the cellphone that is in operation.

(5) When a Bluetooth apparatus is borrowed, the existing Bluetooth protocol may have a misconnected operation.

Based on this, embodiments of the present disclosure provide a communication method, which may be applied to a first electronic apparatus. Functions implemented by the method can be implemented by a processor of the first electronic apparatus calling program codes. The program codes may be stored in a storage medium of the first electronic apparatus. FIG. 1 illustrates a schematic flowchart of a communication method according to some embodiments of the present disclosure. As shown in FIG. 1, the method includes the following steps.

At S101, after a communication connection is established with a second electronic apparatus, configuration information is obtained from the second electronic apparatus;

The first electronic apparatus and the second electronic apparatus may include various types of apparatuses with information processing capabilities, such as cellphones, video phones, smartwatches, smart wristbands, smart glasses, car Bluetooth, Bluetooth headsets, Tablets, All-in-One PCs, etc.

In embodiments of the present disclosure, the first electronic apparatus may include a Bluetooth secondary apparatus, a WiFi (Wi-Fi, mobile hotspot) direct-connected secondary apparatus, or a secondary apparatus of another communication connection. Correspondingly, the second electronic apparatus may include a Bluetooth host apparatus, a WiFi direct-connected host apparatus, or a host apparatus of another communication connection. The configuration information may include a password, a state code, and a time period corresponding to the password, etc.

The communication connection may include various types of communication connection manners such as a Bluetooth communication connection, a WiFi direct connection, etc., which is not limited by embodiments of the present disclosure.

At S102, a communication state between the first electronic apparatus and the second electronic apparatus is monitored, so that second description information corresponding to the second electronic apparatus is at least saved or deleted based on the configuration information after the first electronic apparatus is disconnected from the second electronic apparatus. The second description information at least includes information that indicates the uniqueness of the second electronic apparatus.

The communication state may include a connected state and a disconnected state. The second description information may include information that indicates the uniqueness of the second electronic apparatus, such as a communication address of the second electronic apparatus and identification information of the second electronic apparatus.

In embodiments of the present disclosure, after the communication connection is disconnected, if the first electronic apparatus deletes the information that indicates the uniqueness of the second electronic apparatus, or the second electronic apparatus deletes the information that indicates the uniqueness of the first electronic apparatus, the first electronic apparatus and the second electronic apparatus may not automatically establish a communication connection next time. Oppositely, if the first electronic apparatus and the second electronic apparatus both mutually store information that indicates the uniqueness of the other apparatus, the first electronic apparatus and the second electronic apparatus will automatically establish a communication connection next time.

For example, after a Bluetooth headset (secondary apparatus) establishes a Bluetooth connection to the cellphone (host apparatus), the Bluetooth headset may obtain a state code State=1 from the cell phone (that is, the cellphone sends configuration information of the state code State=1 to the Bluetooth headset). After the Bluetooth connection between the two apparatuses is disconnected, the Bluetooth headset may delete a Bluetooth address of the cellphone according to the state code State=1. Thus, a situation when the cellphone only needs to be connected to the Bluetooth apparatus once, the Bluetooth apparatus needs to be manually disconnected and deleted after use may be improved. For another example, after the Bluetooth headset establishes a Bluetooth connection with the cellphone, the status code State=2 may be obtained from the cellphone (that is, the mobile phone sends the configuration information of the status code State=2 to the Bluetooth headset). When the two apparatuses are disconnected, the Bluetooth headset may save the Bluetooth address of the cellphone according to the state code State=2. As such, the Bluetooth connection can be automatically established between the Bluetooth headset and the cellphone as needed next time.

In some embodiments, after the communication connection is established with the second electronic apparatus, obtaining the configuration information from the second electronic apparatus includes after establishing a first communication connection with the second electronic apparatus, obtaining third configuration information from the second electronic apparatus and corresponding second description information. The third configuration information may at least include information for setting the second electronic apparatus as the host apparatus of the first electronic apparatus and corresponding first authentication information. As such, after being disconnected from the second electronic apparatus, the second description information and the first authentication information may be saved based on the third configuration information. The first communication connection may be a communication connection established for the first time between the first electronic apparatus and the second electronic apparatus. The host control apparatus may represent connection authentication that the second electronic apparatus can control the first electronic apparatus.

In embodiments of the present disclosure, through the methods in steps S101 and S102, a user may be supported directly to select whether the current connection is a temporary connection without modifying the Bluetooth protocol. Thus, the situation that the Bluetooth apparatus needs to be disconnected and deleted manually after use when the host apparatus just needs to be connected to the Bluetooth apparatus once may be improved.

Embodiments of the present disclosure further provide a communication method. The method may be applied to the first electronic apparatus. FIG. 2 illustrates a schematic flowchart of the communication method according to some embodiments of the present disclosure. As shown in FIG. 2, the methods include the following steps.

At S201, after the first communication connection is established with the second electronic apparatus, the first configuration information and the corresponding second description information are obtained from the second electronic apparatus. The first configuration information at least includes information for setting the first communication connection as a temporary connection. Thus, after the second electronic apparatus is disconnected, the second description information may be deleted based on the first configuration information, or the second description information and the first configuration information may be deleted. The first communication connection may be the communication connection established for the first time between the first electronic apparatus and the second electronic apparatus.

The second description information may include a communication address of the second electronic apparatus and the identification information of the second electronic apparatus.

For example, the first configuration information may be a state code State=1, and State=1 indicates that the current communication connection is set as a temporary communication connection.

In embodiments of the present disclosure, the first communication connection may be the communication connection established for the first time between the first electronic apparatus and the second electronic apparatus. The communication connection established for the first time may refer to a communication connection established with another electronic apparatus when the first electronic apparatus does not store apparatus information of any other electronic apparatuses before the communication connection is established. For example, after the user purchases the Bluetooth headset and connects the Bluetooth headset with the cellphone for the first time, the connection is the first communication connection. For another example, after the user purchases the Bluetooth headset, the user selects the temporary connection when the user connects the Bluetooth headset with the mobile phone for the first time. Then, the Bluetooth connection may be disconnected after data transmission. After a few days, the user may connect the Bluetooth headset with the cellphone again, and the connection is still the first communication connection.

At S202, the communication state between the first electronic apparatus and the second electronic apparatus is monitored. Thus, the second description information corresponding to the second electronic apparatus may be deleted based on the configuration information after the first electronic apparatus is disconnected from the second electronic apparatus. The second description information at least includes information that represents the uniqueness of the second electronic apparatus.

Embodiments of the present disclosure further provide a communication method. The method may be applied to the first electronic apparatus. FIG. 3 illustrates a schematic flowchart of still the communication method according to some embodiments of the present disclosure. The method includes the following steps.

At S301, after the first communication connection is established with the second electronic apparatus, the second configuration information and the corresponding second description information are obtained from the second electronic apparatus. The second configuration information may at least include information for setting the second electronic apparatus as a common apparatus of the first electronic apparatus and the corresponding first authentication information. Thus, after the connection is disconnected from the second electronic apparatus, the second description information and the first authentication information may be saved based on the second configuration information. The first communication connection may be the communication connection established for the first time between the first electronic apparatus and the second electronic apparatus. The common apparatus may represent that the first electronic apparatus can be detected and connected.

The common apparatus of the first electronic apparatus may refer to an apparatus that is often communicatively connected to the first electronic apparatus. If the second electronic apparatus is set as a common apparatus of the first electronic apparatus, the first electronic apparatus can automatically establish the communication connection with the second electronic apparatus. The first authentication information may include a pairing password of the common apparatus. The pairing password of the common apparatus may be used to change a non-common apparatus to a common apparatus when any non-common apparatus is connected to the first electronic apparatus. The pairing password of the common apparatus may also be used to change any common apparatus into a host control apparatus that has a highest control authority over the first electronic apparatus.

For example, after the second electronic apparatus sends the pairing password of the common apparatus set by the user to the first electronic apparatus, the first electronic apparatus may know that the second electronic apparatus needs to be set as the common apparatus of the first electronic apparatus. The second configuration information may be the state code State=2. State=2 indicates setting the second electronic apparatus the common apparatus of the first electronic apparatus.

At S302, the communication state between the first electronic apparatus and the second electronic apparatus is monitored. Thus, the second description information corresponding to the second electronic apparatus may be saved based on the configuration information after the first electronic apparatus is disconnected from the second electronic apparatus. The second description information may at least include the information that can indicate the uniqueness of the second electronic apparatus.

Embodiments of the present disclosure further provide a communication method. The method may be applied to the first electronic apparatus. The method includes the following steps.

At S311, After the first communication connection is established with the second electronic apparatus, the second configuration information and the corresponding second description information are obtained from the second electronic apparatus. The second configuration information at least includes the information for setting the second electronic apparatus to the common apparatus of the first electronic apparatus and the corresponding first authentication information. As such, the second description information and first authentication information may be saved based on the second configuration information after the connection is disconnected from the second electronic apparatus. The first communication connection may include the communication connection established for the first time between the first electronic apparatus and the second electronic apparatus. The common apparatus may indicate that the first electronic apparatus can be detected and/or connected by the second electronic apparatus.

After the first electronic apparatus sets the second electronic apparatus as the common apparatus and disconnects the communication connection from the second electronic apparatus, the first electronic apparatus may set the first electronic apparatus as not to be detected by other apparatuses except the common apparatus (including the host control apparatus). If the first electronic apparatus needs to establish a communication connection with a non-common apparatus (i.e., other apparatuses except the common apparatus), the first electronic apparatus needs to establish a communication connection with any common apparatus first. Then, a password for establishing a temporary connection with the non-common apparatus may be set through the common apparatus. After the first electronic apparatus receives the password for the temporary connection, the first electronic apparatus can be detected by the non-common apparatus.

At S312, after the first communication connection is established with the second electronic apparatus, the third configuration information and the corresponding second description information are obtained from the second electronic apparatus. The third configuration information at least includes the information for setting the second electronic apparatus as the host control apparatus of the first electronic apparatus and the corresponding first authentication information. Thus, the second description information and first authentication information may be saved based on the third configuration information after the first electronic apparatus is disconnected from the second electronic apparatus. The first communication connection may be the communication connection established for the first time between the first electronic apparatus and the second electronic apparatus. The host control apparatus may represent the connection authentication that the second electronic apparatus can control the first electronic apparatus.

The third configuration information may include a state code State=3. State=3 indicates that the second electronic apparatus is set as the host control apparatus of the first electronic apparatus. For another example, the third configuration information may be the identification information of the second electronic apparatus. If the first electronic apparatus receives the identification information of the second electronic apparatus, the first electronic apparatus may consider setting the second electronic apparatus to be the host control apparatus of the first electronic apparatus.

In embodiments of the present disclosure, the first electronic apparatus may only have one host control apparatus. The host control apparatus may have the highest control authority over the first electronic apparatus. The host control apparatus can modify or reset the pairing password of the common apparatus.

At S313, the communication status between the first electronic apparatus and the second electronic apparatus is monitored. As such, the second description information corresponding to the second electronic apparatus is at least saved based on the configuration information after the first electronic apparatus is disconnected from the second electronic apparatus. The second description information at least includes the information that represents the uniqueness of the second electronic apparatus.

Embodiments of the present disclosure further provide a communication method. The method may be applied to the first electronic apparatus. FIG. 4 illustrates a schematic flowchart of the communication method according to some embodiments of the present disclosure. The method includes the following steps.

At S401, after a second communication connection is established with the second electronic apparatus, fourth configuration information is obtained from the second electronic apparatus. The fourth configuration information at least includes second authentication information. The second authentication information has a time limit. Thus, the second authentication information is at least deleted after the first electronic apparatus is disconnected from the second electronic apparatus.

In embodiments of the present disclosure, the second communication connection may refer to a communication connection established between the first electronic apparatus and the common apparatus (including the host apparatus). For example, after the user purchases the Bluetooth headset and connects the Bluetooth headset to the cellphone for the first time, the connection is the first communication connection. During the first communication connection, the Bluetooth headset may set the cellphone as a common apparatus according to the configuration information sent by the cellphone. Then, the connection may be disconnected after communication. After a while, the user may connect the Bluetooth headset to the cellphone via Bluetooth again, and this connection may be the second communication connection. The second communication connection may be an automatic connection.

In embodiments of the present disclosure, after the first electronic apparatus establishes a connection with the common apparatus (including the host control apparatus), the common apparatus may be configured to set password information required for connecting the first electronic apparatus to a non-common apparatus, that is, a temporary pairing password. Correspondingly, the fourth configuration information (i.e., the second authentication information) may be the temporary pairing password. In addition, the temporary pairing password may have a time limit. If the time limit expires, the first electronic apparatus may delete the temporary pairing password and set the first electronic apparatus to be undetectable for the non-common apparatus.

At S402, the communication state between the first electronic apparatus and the second electronic apparatus is monitored. As such, the second description information corresponding to the second electronic apparatus is at least saved based on the configuration information after the first electronic apparatus is disconnected from the second electronic apparatus. The second description information at least includes information that represents the uniqueness of the second electronic apparatus.

Embodiments of the present disclosure further provide a communication method. The method may be applied to the first electronic apparatus. The method includes the following steps.

At S411, after the second communication connection is established with the second electronic apparatus, the fourth configuration information is obtained from the second electronic apparatus. The fourth configuration information at least includes the second authentication information. The second authentication information has a time limit. The second authentication information is at least deleted after a first time period that the first electronic apparatus is disconnected from the second electronic apparatus.

At S412, the communication state between the first electronic apparatus and the second electronic apparatus is monitored. As such, the second description information corresponding to the second electronic apparatus is at least saved based on the configuration information after the first electronic apparatus is disconnected from the second electronic apparatus. The second description information at least includes the information that represents the uniqueness of the second electronic apparatus.

At S413, after the third electronic apparatus establishes a temporary connection with the first electronic apparatus through the second authentication information, if fifth configuration information is obtained, a communication state between the third electronic apparatus and the first electronic apparatus is monitored. As such, the first electronic apparatus and the third electronic apparatus delete or save description information of each other after the first electronic apparatus is disconnected from the third electronic apparatus. The fifth configuration information is information of whether to set the third electronic apparatus as a common apparatus of the first electronic apparatus.

The third electronic apparatus may be a non-common apparatus. The third electronic apparatus may request to establish the temporary connection with the first electronic apparatus based on the temporary pairing password. The first electronic apparatus may verify the temporary pairing password. If the temporary pairing password is verified, the first electronic apparatus may establish the temporary connection with the third electronic apparatus. After the temporary connection is established, the third electronic apparatus may request the first electronic apparatus to set the third electronic apparatus as a common apparatus of the first electronic apparatus based on the pairing password of the common apparatus. The first electronic apparatus may perform verification on the pairing password of the common apparatus. If the pairing password is verified, the first electronic apparatus may set the third electronic apparatus as the common apparatus of the first electronic apparatus.

In embodiments of the present disclosure, the fifth configuration information may be a state code State=2. State=2 indicates setting the host apparatus as a common apparatus. The fifth configuration information may also be the pairing password of the common apparatus. After the first electronic apparatus receives the pairing password of the common apparatus, the first electronic apparatus may also consider setting the third electronic apparatus as the common apparatus.

Embodiments of the present disclosure further provide a communication method. The method may be applied to the first electronic apparatus. FIG. 5 illustrates a schematic flowchart of the communication method according to some embodiments of the present disclosure. The methods include the following steps.

At S501, after the first electronic apparatus establishes a communication connection with the second electronic apparatus, sixth configuration information included in the communication protocol corresponding to the communication connection is determined. The sixth configuration information at least includes information for setting the communication connection as a temporary connection. As such, the second description information corresponding to the second electronic apparatus is at least deleted based on the sixth configuration information after the first electronic apparatus is disconnected from the second electronic apparatus.

The communication protocol may be directly modified. A communication segment, which indicates that the communication connection is a temporary connection, may be added to the communication protocol. As such, the first electronic apparatus and the second electronic apparatus may use this communication protocol to perform a communication connection. After the first electronic apparatus is disconnected from the second electronic apparatus, the first electronic apparatus and the second electronic apparatus may delete apparatus information of each other.

At S502, the communication state between the first electronic apparatus and the second electronic apparatus is monitored. As such, the second description information corresponding to the second electronic apparatus is at least deleted based on the configuration information after the first electronic apparatus is disconnected from the second electronic apparatus. The second description information at least includes the information that represents the uniqueness of the second electronic apparatus.

Embodiments of the present application further provide a communication method, which may be applied to the second electronic apparatus. Functions implemented by the method may be implemented by a processor of the second electronic apparatus calling program codes. Program codes may be stored in a storage medium of the second electronic apparatus. FIG. 6 illustrates a schematic flowchart of the communication method according to some embodiments of the present disclosure. As shown in FIG. 6, the method includes the following steps.

At S601, after the second electronic apparatus establishes a communication connection with the first electronic apparatus, the second electronic apparatus sends corresponding configuration information to the first electronic apparatus at least based on an obtained input operation.

After the second electronic apparatus establishes the communication connection with the first electronic apparatus, a selection interface may pop up in the first electronic apparatus. The selection interface may be configured to prompt the user of "whether to set the second electronic apparatus as a common apparatus of the first electronic apparatus, if not, the second electronic apparatus only being connected to the first electronic apparatus this time." Correspondingly, the input operation may include that the user selects to set the second electronic apparatus as the common apparatus of the first electronic apparatus. The input operation may further include that the user selects to connect the second electronic apparatus only this time.

The input operation may also include an operation performed by the user on the second electronic apparatus when the user needs to obtain the temporary pairing password. Correspondingly, the configuration information may include the temporary pairing password.

At S602, the communication state between the first electronic apparatus and the second electronic apparatus is monitored. As such, the first description information corresponding to the first electronic apparatus is at least saved or deleted based on the configuration information after the first electronic apparatus is disconnected from the second electronic apparatus. The first description information at least includes information that represents the uniqueness of the first electronic apparatus.

In some embodiments, at S601, after the second electronic apparatus establishes the communication connection with the first electronic apparatus, sending the corresponding configuration information to the first electronic apparatus at least based on the obtained input operation includes, after the second electronic apparatus establishes the first communication connection with the first electronic apparatus, sending the corresponding third configuration information to the first electronic apparatus based on an obtained third input operation. The third configuration information may at least include the information for setting the second electronic apparatus as the host control apparatus of the first electronic apparatus and the corresponding first authentication information. As such, the first description information corresponding to the first electronic apparatus may be saved based on the third configuration information after the second electronic apparatus is disconnected from the first electronic apparatus.

The first communication connection may be a communication connection that is established for the first time between the first electronic apparatus and the second electronic apparatus. The host control apparatus may represent the connection authentication that the second electronic apparatus can control the first electronic apparatus.

Embodiments of the present disclosure further provide a communication method, which may be applied to the second electronic apparatus. The method includes the following steps.

At S611, after the second electronic apparatus establishes the first communication connection with the first electronic apparatus, the second electronic apparatus sends the corresponding first configuration information to the first electronic apparatus based on the obtained first input operation. The first configuration information at least includes the information for setting the first communication connection as a temporary connection. As such, the first description information corresponding to the first electronic apparatus is deleted or the first description information and the first configuration information are deleted based on the first configuration information after the second electronic apparatus is disconnected from the first electronic apparatus. The first communication connection is the communication connection that is established for the first time between the first electronic apparatus and the second electronic apparatus.

After the second electronic apparatus establishes the communication connection with the first electronic apparatus, a selection interface may pop up in the first electronic apparatus. The selection interface may be configured to prompt the user of "whether to set the second electronic apparatus as the common apparatus of the first electronic apparatus, if not, the second electronic apparatus being only connected to the first electronic apparatus this time." Correspondingly, the first input operation may include an operation that the user selects to connect the second electronic apparatus only this time.

At S612, the communication state between the first electronic apparatus and the second electronic apparatus is monitored. As such, the first description information corresponding to the first electronic apparatus is deleted based on the configuration information after the first electronic apparatus is disconnected from the second electronic apparatus. The first description information at least includes the information that represents the uniqueness of the first electronic apparatus.

Embodiments of the present disclosure further provide a communication method, which may be applied to the second electronic apparatus. The method includes the following steps.

At S621, after the second electronic apparatus establishes the first communication connection with the first electronic apparatus, the second electronic apparatus sends corresponding second configuration information to the first electronic apparatus based on an obtained second input operation. The second configuration information at least includes information for setting the second electronic apparatus as the common apparatus of the first electronic apparatus and the corresponding first authentication information. As such, the first description information corresponding to the first electronic apparatus is saved based on the second configuration information after the second electronic apparatus is disconnected from the first electronic apparatus. The first communication connection is the communication connection that is established for the first time between the first electronic apparatus and the second electronic apparatus. The common apparatus represents that the first electronic apparatus can be detected and/or connected by the second electronic apparatus.

After the second electronic apparatus establishes the communication connection with the first electronic apparatus, a selection interface may pop up in the first electronic apparatus. The selection interface may be configured to prompt the user of "whether to set the second electronic apparatus as the common apparatus of the first electronic apparatus, if not, the second electronic apparatus being only connected to the first electronic apparatus this time." Correspondingly, the second input operation may include an operation that the user selects to set the second electronic apparatus as the common apparatus of the first electronic apparatus.

At S622, the communication state between the first electronic apparatus and the second electronic apparatus is monitored. As such, the first description information corresponding to the first electronic apparatus is at least saved based on the configuration information after the first electronic apparatus is disconnected from the second electronic apparatus. The first description information at least includes information that represents the uniqueness of the first electronic apparatus.

Embodiments of the present disclosure further provide a communication method, which may be applied to the second electronic apparatus. The method includes the following steps.

At S631, after the second electronic apparatus establishes a second communication connection with the first electronic apparatus, the second electronic apparatus sends corresponding fourth configuration information to the first electronic apparatus based on an obtained fourth input operation. The fourth configuration information at least includes the second authentication information. The second authentication information has a time limit. Thus, the first electronic apparatus at least deletes the second authentication information after a first period of time that the first electronic apparatus is disconnected from the second electronic apparatus.

If the second electronic apparatus is a common apparatus, after the second electronic apparatus establishes the communication connection with the first electronic apparatus, the user may click a button of setting a temporary pairing password in the second electronic apparatus to cause the second electronic apparatus to randomly generate and send a temporary pairing password to the first electronic apparatus. Correspondingly, an operation of clicking the button of setting the temporary pairing password may be the fourth input operation.

At S632, the communication state between the first electronic apparatus and the second electronic apparatus is monitored. As such, the first description information corresponding to the first electronic apparatus is at least deleted based on the configuration information after the first electronic apparatus is disconnected from the second electronic apparatus. The first description information at least includes information that can represent the uniqueness of the first electronic apparatus.

In some embodiments, the second authentication information may be used to authenticate the identity of the third electronic apparatus when the first electronic apparatus establishes a temporary connection with the third electronic apparatus.

Correspondingly, the first authentication information may be used to perform identity authentication on the third electronic apparatus when the third electronic apparatus is set as a common apparatus of the first electronic apparatus.

Embodiments of the present disclosure further provide a communication method, which may be applied to the second electronic apparatus. The method includes the following steps.

At S641, after the second electronic apparatus establishes the communication connection with the first electronic apparatus, sixth configuration information is added to the communication protocol corresponding to the communication connection based on the obtained input operation, and the second electronic apparatus sends the sixth configuration information to the first electronic apparatus. The sixth configuration information includes at least the information for setting the communication connection as the temporary connection. As such, the first description information corresponding to the first electronic apparatus is deleted based on the sixth configuration information after the second electronic apparatus is disconnected from the first electronic apparatus.

The communication protocol can be directly modified. A communication segment, which can indicate that the communication connection is a temporary connection, may be added to the communication protocol. As such, the first electronic apparatus and the second electronic apparatus may use this communication protocol to perform the communication connection. After the first electronic apparatus is disconnected from the second electronic apparatus, the first electronic apparatus and the second electronic apparatus may delete apparatus information of each other.

At S642, the communication state between the first electronic apparatus and the second electronic apparatus is monitored. As such, the first description information corresponding to the first electronic apparatus is deleted based on the configuration information after the first electronic apparatus is disconnected from the second electronic apparatus. The first description information at least includes the information that represents the uniqueness of the first electronic apparatus.

Embodiments of the present application provide two communication solutions, which may be mainly applied to a Bluetooth communication connection.

(1) In communication solution one, when an apparatus (host apparatus) is connected to a Bluetooth apparatus (secondary apparatus), a pop-up window may ask the host apparatus of "whether to set the apparatus as a common apparatus or only connect the apparatus this time." Communication solution one further includes two application scenarios.

In a first application scenario (setting the host control apparatus), when the host apparatus is connected to the Bluetooth apparatus for the first time, a pop-up window may ask the host apparatus of "whether to set the apparatus as the common apparatus, or only connect the apparatus this time." If the common apparatus is selected, the apparatus may be added to an apparatus list. After the connection is successful, a connection password of the common apparatus may be required to set. Whether the common apparatus is the host control apparatus may also be set. The host control apparatus may have the highest control authority over the Bluetooth apparatus (a Bluetooth apparatus can only have one host control apparatus).

The host control apparatus may set the pairing password for the common apparatus (the common apparatus pairing password, which is permanently valid). After the host control apparatus is disconnected, and another apparatus is successfully connected by using the temporary pairing password, the common apparatus pairing password may be entered. The Bluetooth apparatus may check the common apparatus pairing password. If the pairing password is verified, the connection of the another apparatus may be successful, and the common apparatus information may not be cleared after the connection is disconnected. Within the communication range, when the host control apparatus and the common apparatus turn on Bluetooth at the same time, a last apparatus may be connected first. When the Bluetooth of the host control apparatus is turned off or is not within the communication range, the common apparatus may be connected first. When neither the host control apparatus nor the common apparatus is within the communication range, only the temporary pairing password may be used to connect.

When a new Bluetooth apparatus needs to be borrowed, temporarily connected, and detected, the common apparatus or the host control apparatus may need to be configured to set a temporary pairing password (one-time password, which will become invalid after use, and before use, a time limit of the password may be set). When the Bluetooth apparatus is disconnected from the host apparatus and connected to another apparatus, a temporary pairing connection password may need to be entered. The Bluetooth apparatus may check the temporary pairing password. If the temporary pairing connection password and the temporary pairing password are not the same, the connection fails. If the temporary pairing connection password and the temporary pairing password are the same, the connection is successful, and the connection is a one-time connection. After the two apparatuses are successfully connected, the apparatus attribute of the apparatus may be modified to the common apparatus by entering the password of the common apparatus. If the connection attribute is not modified, the password will be invalid after the two apparatuses are actively disconnected. The host apparatus needs to authorize again. After the apparatuses are disconnected, when the host apparatus is within the communication range, the Bluetooth apparatus still actively connects to the host control apparatus or the common apparatus.

When the temporary pairing password is not set, if neither the host apparatus nor the common apparatus has turned on Bluetooth, other surrounding apparatuses cannot detect the Bluetooth apparatus.

If the host apparatus is lost, if passwords of the host apparatus and common apparatus have been set, another common apparatus that has been connected may be configured to modify the host control apparatus to be the common apparatus that is currently connected. The pairing password of the common apparatus and the temporary pairing password may be reset. If the password of the common apparatus is lost or is not set, the apparatus may be connected and used again by restoring the factory apparatus function.

In a second application scenario (the host control apparatus is not set), when the Bluetooth apparatus is connected, the pop-up window will always ask the host apparatus of "whether to set the apparatus as the common apparatus, or only connect the apparatus this time." If to only connect the apparatus this time is selected, when the two apparatuses are disconnected, the apparatus information will be cleared. Next time when the Bluetooth apparatus is connected, the pop-up window will still appear.

In embodiments of the present disclosure, in the communication solution one, the pop-up window may be only added to the host apparatus, and the Bluetooth protocol may not need to be changed. Meanwhile, the password of the Bluetooth apparatus may be set by the host apparatus to ensure the security of the apparatus and prevent an unrelated person from using the Bluetooth apparatus. In addition, the only host apparatus with control authority may be set for the Bluetooth apparatus. When the Bluetooth apparatus is borrowed, the temporary pairing password may need to be checked to ensure the security of the Bluetooth apparatus and prevent the unrelated person from using the Bluetooth apparatus. When the host apparatus does not turn on the Bluetooth switch, other host apparatuses within the communication range will not receive the Bluetooth apparatus information pop-up reminder. When no host apparatus with the control authority is set for the Bluetooth apparatus, the pop-up window will prompt for each connection. If a temporary connection is selected, the apparatus information will be cleared after the two apparatuses are disconnected. As such, the following technical effects can be achieved. 1) The Bluetooth protocol may not need to be modified, and the pop-up window may be included on an apparatus end for support. 2) the situation that other apparatuses within the communication range receive Bluetooth apparatus information when the Bluetooth of the host apparatus is turned off may be improved. 3) The host apparatus with the control authority may decide whether to allow the Bluetooth apparatus to be connected to other host apparatuses to improve the security of the apparatus. 4) A step of manually reconnecting when reconnecting to the host apparatus may be reduced.

(2) In communication solution two, the existing Bluetooth protocol may be modified. A temporary connection segment may be added, that is, the temporary Bluetooth protocol. When the host apparatus detects the Bluetooth apparatus, the host apparatus may receive and parse the pairing request of the Bluetooth apparatus. If a temporary Bluetooth protocol is detected, the host apparatus may clear all information of the Bluetooth apparatus after the two apparatuses are disconnected. For a next connection, a manual connection may still be needed.

In embodiments of the present disclosure, the temporary Bluetooth protocol may be added in communication solution two, which can meet the application scenarios of one-time connections of more Bluetooth apparatuses, especially when the host apparatus does not have a screen. When the host apparatus is connected to the Bluetooth secondary apparatus, the Bluetooth secondary apparatus may communicate with the host apparatus by using the temporary Bluetooth protocol. After the two apparatuses are disconnected, the apparatus may clear connected apparatus information. That is, when the apparatus needs to be connected again next time, the apparatus may need to be manually reconnected. As such, the following technical effects can be achieved. The Bluetooth protocol may be modified, and a temporary connection state code may be added, that is, the temporary Bluetooth protocol. Thus, the method may be applied to more one-time connection scenarios.

The two communication solutions are described in detail below.

(1) Communication Solution One

FIG. 7A illustrates a schematic structural diagram showing hardware of a Bluetooth apparatus according to some embodiments of the present disclosure. As shown in FIG. 7A, a single chip 71 of the Bluetooth secondary apparatus selects a host control module 72 with a Real_Time Clock (RTC) function, a Read-Only Memory (ROM) memory ship 73, and a Bluetooth module 74. The RTC of the host control module 72 may be configured to record a time length of a temporarily connected apparatus. The ROM memory chip 73 may be used to store the temporary pairing password, the common apparatus pairing password, the Bluetooth address of the host apparatus, and a connection time limit of temporary pairing apparatus, etc. The single chip 71 may be a micro control unit (MCU).

When the Bluetooth secondary apparatus is in an initial state, State=0 is stored in the ROM, that is the initial state. In the initial state, the Bluetooth apparatus is visible to all surrounding host apparatuses, which can be paired with and connected to, and communicate with the Bluetooth apparatus.

Figure 7B:
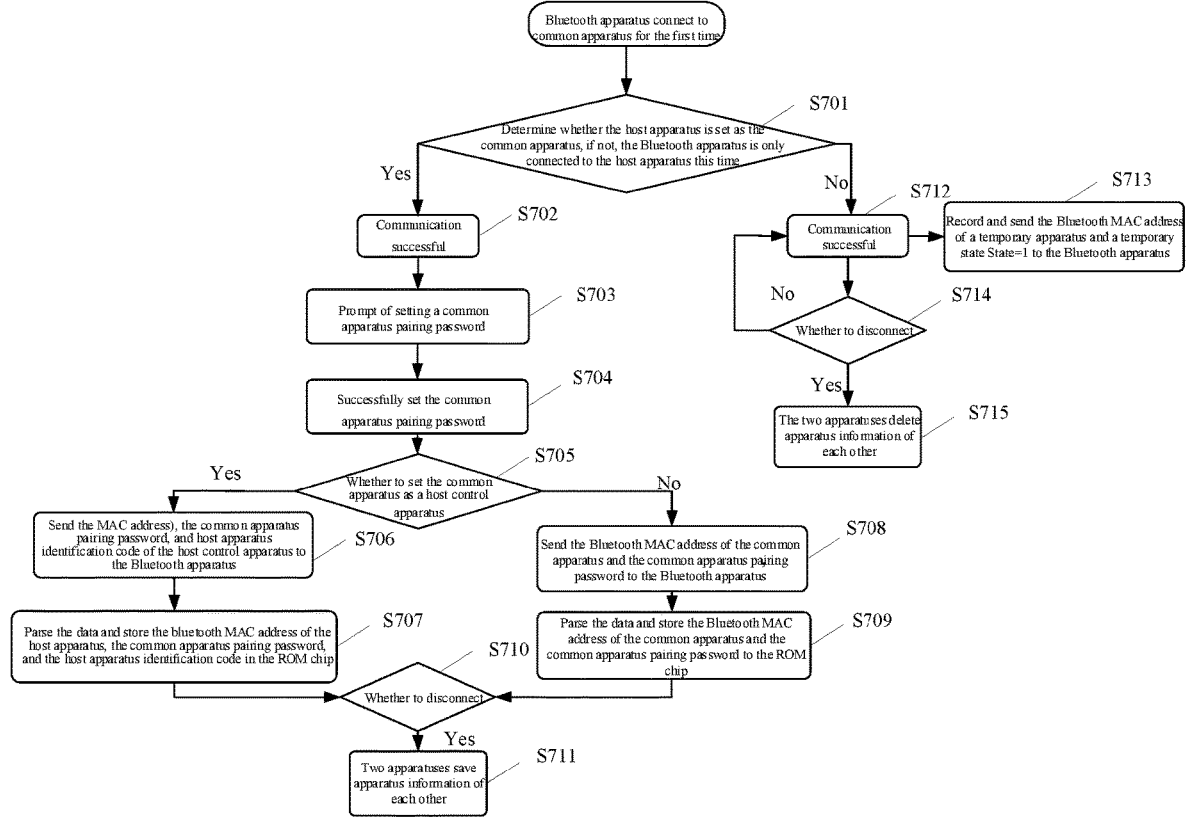
FIG. 7B illustrates a schematic flowchart of still another communication method according to some embodiments of the present disclosure.

FIG. 7B illustrates a schematic flowchart of still another communication method according to some embodiments of the present disclosure. As shown in FIG. 7B, the application scenario of the method is that the Bluetooth apparatus is used for the first time. That is, the Bluetooth apparatus is connected to a common apparatus for the first time. The method includes the following steps.

At S701, whether the host apparatus is set as the common apparatus is determined, if not, the Bluetooth apparatus is only connected to the host apparatus this time.

If the user chooses to set the host apparatus as a common apparatus of the Bluetooth apparatus, step S702 is performed. Otherwise, step S712 is performed.

In embodiments of the present disclosure, when the host apparatus is successfully connected to the Bluetooth apparatus, the Bluetooth apparatus may first send a state code State=0. After the host apparatus receives and parses the state code, a pop-up window may prompt the user of "whether to set the apparatus as a common apparatus, if not, the Bluetooth apparatus being only connected to the apparatus this time."

At S702, the communication is successful.

At S703, a reminder of setting the common apparatus pairing password is provided.

The user may be prompted that the common apparatus pairing password needs to be set. If the user has set the common apparatus pairing password, step S704 is performed.

Step S704, the common apparatus pairing password is successfully set.

Step S705, whether the common apparatus is set as the host apparatus is determined.

If the user chooses to set the common apparatus as the host apparatus, step S706 is performed; otherwise, step S708 is performed.

Step S706, the host control apparatus sends a Bluetooth Media Access Control Address (MAC, being a local area network address), the common apparatus pairing password, and host apparatus identification code of the host control apparatus to the Bluetooth apparatus.

If the Bluetooth apparatus receives the common device pairing password sent by the host apparatus, it means that the user sets the host apparatus as the common apparatus. A state code State=2 may also be set. The state code may be sent to the Bluetooth apparatus. The state code can also indicate that the host apparatus is set as the common apparatus.

At S707, the Bluetooth apparatus parses the data and stores the Bluetooth MAC address of the host apparatus, the common apparatus pairing password, and the host apparatus identification code in the ROM chip.

At S708, the common apparatus sends the Bluetooth MAC address of the common apparatus and the common apparatus pairing password to the Bluetooth apparatus.

At S709, the Bluetooth apparatus parses the data and stores the Bluetooth MAC address of the common apparatus and the common apparatus pairing password to the ROM chip.

After step S707 and step S709, following step S710 is executed.

At S710, whether the connection is disconnected is determined.

If the host apparatus and the secondary apparatus are disconnected, following step S711 is performed.

At S711, the two apparatuses save apparatus information of each other.

In embodiments of the present disclosure, if the user chooses to set the host apparatus as the common apparatus, the common apparatus will be required to set a common apparatus pairing password after the connection is successful. If the host control device has not been set, a pop-up window will prompt user of whether to set the common apparatus as the host control apparatus. After the common apparatus is set, the common apparatus pairing password and the Bluetooth MAC address of the common apparatus may be sent to the Bluetooth apparatus via Bluetooth. The Bluetooth apparatus may receive and parse the information and stores the information in the ROM chip. After the two apparatuses disconnect the Bluetooth connection, the Bluetooth apparatus is invisible to other apparatuses except the common apparatus (including the host control apparatus, which is also a common apparatus). When a plurality of common apparatuses appear within the communication range, a connection order of the Bluetooth apparatus is a most recently connected common apparatus. Meanwhile, the host control apparatus may update and modify the common apparatus pairing password. That is, when the common apparatus pairing password is lost, the password can only be reset through the host control apparatus. Both the common apparatus and the host control apparatus may set a temporary pairing password and modify the time limit of the temporary pairing password. After the common apparatus is connected to the Bluetooth apparatus, the common apparatus may be set as the host control apparatus by entering the common apparatus pairing password.

At S712, the communication is successful.

At S713, the Bluetooth MAC address of a temporary apparatus and a temporary state State=1 are recorded and sent to the Bluetooth apparatus.

At S714, whether the connection is disconnected is determined.

If the two apparatuses are disconnected, step S715 is performed. Otherwise, step S712 is performed.

At S715, the two apparatuses delete the apparatus information of each other.

In embodiments of the present disclosure, if the user chooses to only connect the host apparatus this time, after the host apparatus establishes the communication with the Bluetooth apparatus, the host apparatus sends the temporary connection state code State=1 and the Bluetooth MAC address of the host apparatus to the Bluetooth apparatus. After the two apparatuses disconnect the communication, the Bluetooth apparatus may delete the Bluetooth address of the host apparatus and deletes the connection record. That is, without a manual connection, the Bluetooth apparatus cannot communicate with the host apparatus automatically.

Steps S201 and S202 and steps S611 and S612 correspond to temporary connections in the communication method of FIG. 7B. Steps S301 and S302, and steps S621 and S622 correspond to setting the host apparatus as the common apparatus in the communication method of FIG. 7B. Steps S311 to S313 correspond to setting the host apparatus as the host control apparatus in the communication method of FIG. 7B.

Figure 7C:
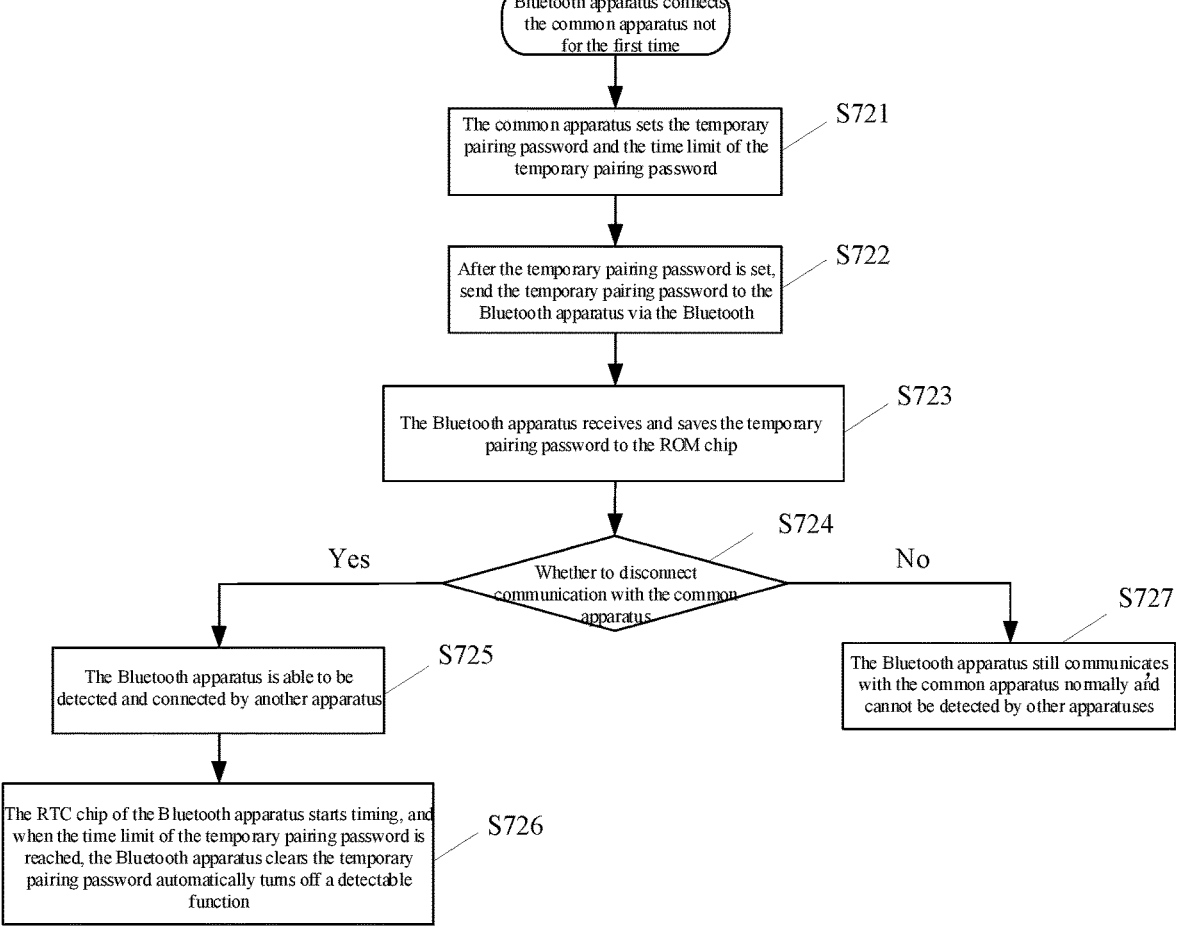
FIG. 7C illustrates a schematic flowchart of still another communication method according to some embodiments of the present disclosure.

FIG. 7C illustrates a schematic flowchart of a communication method according to some embodiments of the present disclosure. As shown in FIG. 7C, the application scenario of the method is that the Bluetooth apparatus is not used for the first time. That is, the Bluetooth apparatus is not connected to the common apparatus for the first time. The method includes the following steps.

At S721, the common apparatus sets the temporary pairing password and the time limit of the temporary pairing password.

In embodiments of the present disclosure, the Bluetooth apparatus has set the common apparatus. When the user wants to temporarily connect the Bluetooth apparatus to another apparatus, the Bluetooth apparatus may need to be connected to the common apparatus first. The temporary pairing password may be set for the Bluetooth apparatus. The Bluetooth apparatus may be paired and connected to the another apparatus through the temporary pairing password, which can prevent error connections between the apparatuses.

At S722, after the temporary pairing password is set, the temporary pairing password is sent to the Bluetooth apparatus via the Bluetooth.

At S723, the Bluetooth apparatus receives and saves the temporary pairing password to the ROM chip.

At S724, whether the communication with the common apparatus is disconnected is determined.

If the two apparatuses disconnect the communication, step S725 may be performed. Otherwise, step S727 may be performed.

At S725, the Bluetooth apparatus can be detected and connected by another apparatus.

At S726, at the same time, the RTC chip of the Bluetooth apparatus starts timing, and when the time limit of the temporary pairing password is reached, the Bluetooth apparatus clears the temporary pairing password automatically turns off a detectable function.

At S727, the Bluetooth apparatus still communicates with the common apparatus normally and cannot be detected by other apparatuses.

In embodiments of the present disclosure, after the common apparatus sets the temporary pairing password of the Bluetooth apparatus and the time limit of the temporary pairing password, the common apparatus may send data to the Bluetooth apparatus via the Bluetooth connection. After receiving the information, the Bluetooth apparatus may parse and store the information in the ROM chip. When the common apparatus is disconnected from the Bluetooth apparatus, the RTC of the Bluetooth apparatus starts timing. When the time limit of the temporary pairing password is reached, the Bluetooth apparatus may delete the temporary pairing password and turn off the detectable function for a non-common apparatus.

Steps S401 and S402 and steps S631 and S632 may correspond to the communication method in FIG. 7C.

Figure 7D:
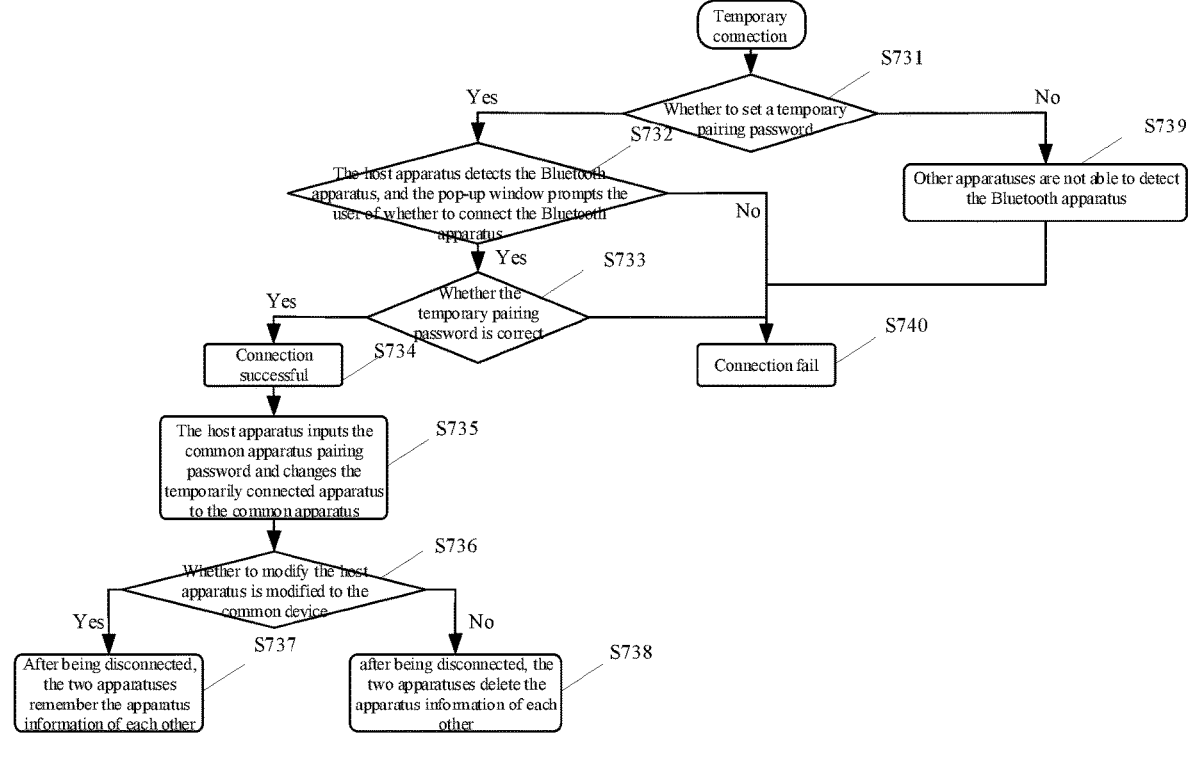
FIG. 7D illustrates a schematic flowchart of still another communication method according to some embodiments of the present disclosure.

FIG. 7D illustrates a schematic flowchart of a communication method according to some embodiments of the present disclosure. As shown in FIG. 7D, the application scenario of the method is a temporary connection, that is, a connection between the Bluetooth apparatus and a non-common apparatus. The method includes the following steps.

At S731, whether a temporary pairing password is set is determined.

If the temporary pairing password has been set, step S732 is performed. Otherwise, step S739 is performed.

At S732, the host apparatus detects the Bluetooth apparatus, and the pop-up window prompts the user of whether to connect the Bluetooth apparatus.

If the user chooses to connect the Bluetooth apparatus, step S733 is performed. Otherwise, step S740 is performed.

At S733, whether the temporary pairing password is correct is determined.

If the temporary pairing password entered by the user is correct, step S734 is performed. Otherwise, step S740 is performed.

At S734, the connection is successful.

At S735, the host apparatus inputs the common apparatus pairing password and changes the temporarily connected apparatus to the common apparatus.

At S736, whether the host apparatus is modified to the common device is determined.

If the user chooses to modify the host apparatus to the common apparatus, step S737 is performed. Otherwise, step S738 is performed.

At S737, after being disconnected, the two apparatuses remember the apparatus information of each other.

At S738, after being disconnected, the two apparatuses delete the apparatus information of each other.

At S739, other apparatuses are not able to detect the Bluetooth apparatus.

At S740, the connection fails.

In embodiments of the present disclosure, after the temporary pairing password is set, the Bluetooth apparatus will be visible to all apparatus within the communication range. When the host device (non-common apparatus, that is, the temporarily connected apparatus) is connected to the Bluetooth apparatus, the Bluetooth communication has been established, and the pop-up window of the host device requires the temporary pairing password. The entered temporary pairing password may be sent to the Bluetooth apparatus via the Bluetooth. The Bluetooth apparatus may compare the received password with a value stored in the ROM. If the received password and the value are the same, the communication is normal. If the received password and the value are not the same, the Bluetooth apparatus may disconnect the communication with the host apparatus. When the Bluetooth apparatus is connected to and communicates with the host apparatus (non-common apparatus) by using the temporary pairing password, the RTC of the Bluetooth apparatus may start timing. When the time limit of the temporary pairing password is reached, the Bluetooth apparatus may disconnect the communication connection with the host apparatus. When the temporary connection needs to be used again, the common apparatus may need to re-authorize.

Steps S411 to S413 correspond to the communication method in FIG. 7D.

In some embodiments, when the user forgets the common apparatus pairing password, the Bluetooth apparatus may be connected to the host control apparatus. The user may choose to forget the password in the setting to reset. If the host control apparatus is not available, restoring the factory setting can only be selected.

In some embodiments, when the host control apparatus is lost but the common apparatus pairing password is remembered, the common apparatus may be selected to be connect to the Bluetooth apparatus. The common apparatus pairing password may be entered to set the common apparatus with the authority of the host control apparatus.

(2) Communication Solution Two

Figure 7E:
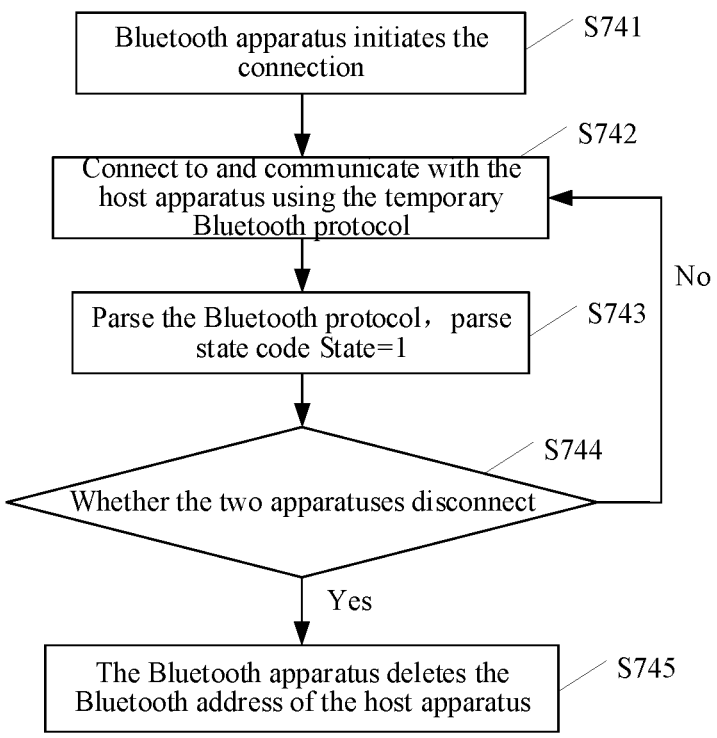
FIG. 7E illustrates a schematic flowchart of still another communication method according to some embodiments of the present disclosure.

FIG. 7E illustrates a schematic flowchart of still another communication method according to some embodiments of the present disclosure. As shown in FIG. 7E, the application scenario of the method includes a temporary connection. The method includes the following steps.

At S741, the Bluetooth apparatus initiates a connection.

At S742, the Bluetooth apparatus is connected to and communicates with the host apparatus using the temporary Bluetooth protocol.

At S743, the Bluetooth apparatus parses the Bluetooth protocol and the state code State=1.

The state code State=1 indicates that the communication connection is a temporary communication connection.

At S744, whether the two apparatuses are disconnected is determined.

If the two apparatuses are disconnected, step S745 is performed. Otherwise, step S742 is performed.

At S745, the Bluetooth apparatus deletes the Bluetooth address of the host apparatus.

In embodiments of the present disclosure, when the Bluetooth apparatus only needs to communicate with the host apparatus in a one-time connection manner, a fixed segment may be added to the communication protocol. When the Bluetooth apparatus and the host apparatus successfully establish the connection, the Bluetooth apparatus may add the state code State=1 to the communication content. The host apparatus may receive and parse the information to obtain the state code State=1, which means that the communication is a one-time connection communication. After the two apparatuses are disconnected, the host apparatus may delete the Bluetooth MAC address of the Bluetooth apparatus, or only the Bluetooth apparatus may delete the Bluetooth MAC address of the host apparatus.

Steps S501 and S502 and steps S641 and S642 correspond to the communication method in FIG. 7E.

Figure 8:
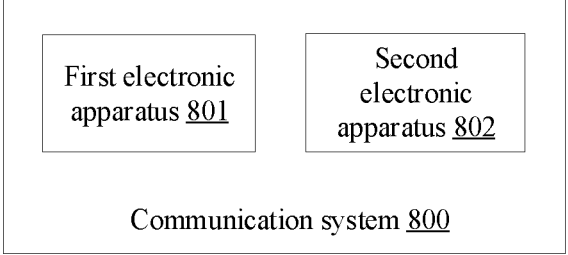
FIG. 8 illustrates a schematic structural diagram of a communication system according to some embodiments of the present disclosure.

Embodiments of the present disclosure provide a communication system. FIG. 8 illustrates a schematic structural diagram of a communication system 800 according to some embodiments of the present disclosure. As shown in FIG. 8, the communication system 800 includes a first electronic apparatus 801 and a second electronic apparatus 802.

After the first electronic apparatus 801 establishes a communication connection with the second electronic apparatus 802, the second electronic apparatus 802 may send corresponding configuration information to the first electronic apparatus 801.

After the first electronic apparatus 801 is disconnected from the second electronic apparatus 802, the first electronic apparatus 801 may at least save or delete the second description information corresponding to the second electronic apparatus 802 based on the configuration information, and/or the second electronic apparatus 802 may at least save or delete the first description information corresponding to the first electronic apparatus 801 based on the configuration information.

The first description information may include at least information that represents the uniqueness of the first electronic apparatus 801. The second description information may include at least information that represents the uniqueness of the second electronic apparatus 802.

Embodiments of the present application provide a communication device. Units included in the device, modules included in the units, and components included in the modules may be implemented by a processor of the first electronic apparatus or a specific logic circuit. In some embodiments, the processor may include a Central Processing Unit (CPU), a Microprocessor Unit (MPU), a digital signal processor (DSP), or a Field Programmable Gate Array (FPGA), etc.

Figure 9A:
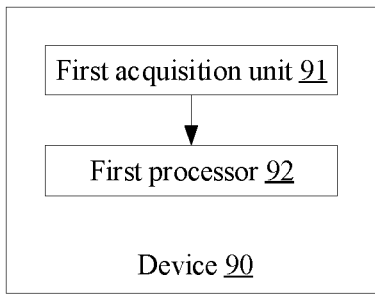
FIG. 9A illustrates a schematic structural diagram of a communication device according to some embodiments of the present disclosure.

FIG. 9A illustrates a schematic structural diagram of a communication device 90 according to some embodiments of the present disclosure. As shown in FIG. 9A, the device 90 includes a first acquisition unit 91 and a first processor 92.

The first acquisition unit 91 may be configured to obtain at least configuration information from the second electronic apparatus after a communication connection is established with the second electronic apparatus.

The first processor 92 may be configured to monitor a communication state between the first electronic apparatus and the second electronic apparatus to at least save or delete the second description information corresponding to the second electronic apparatus based on the configuration information after the first electronic apparatus is disconnected from the second electronic apparatus. The second description information may at least include the information that represents the uniqueness of the second electronic apparatus.

In some embodiments, the first acquisition unit 91 includes a first acquisition module.

The first acquisition module may be configured to obtain the first configuration information and the corresponding second description information from the second electronic apparatus after the first communication connection is established with the second electronic apparatus. The first configuration information may at least include information for setting the first communication connection as a temporary connection. Thus, the first acquisition module may be configured to delete the second description information based on the first configuration information or delete the second description information and the first configuration information after the first electronic apparatus is disconnected from the second electronic apparatus.

The first communication connection may be a communication connection established between the first electronic apparatus and the second electronic apparatus for the first time.

In some embodiments, the first acquisitions unit 91 further includes a second acquisition module.

The second acquisition module may be configured to obtain the second configuration information and the corresponding second description information from the second electronic apparatus after the first communication connection is established with the second electronic apparatus. The second configuration information may at least include information for setting the second electronic apparatus as a common apparatus of the first electronic apparatus and corresponding first authentication information. Thus, the second acquisition module may be further configured to save the second description information and the first authentication information based on the second configuration information after the first electronic apparatus is disconnected from the second electronic apparatus.

The first communication connection may be the communication connection established between the first electronic apparatus and the second electronic apparatus for the first time. The common apparatus may indicate that the first electronic apparatus can be detected by and/or connected to the second electronic apparatus.

In some embodiments, the first acquisition unit 91 further includes a third acquisition module.

The third acquisition module may be configured to obtain third configuration information and the corresponding second description information from the second electronic apparatus after the first communication connection is established with the second electronic apparatus. The third configuration information may at least include information for setting the second electronic apparatus as a host control apparatus of the first electronic apparatus and the corresponding first authentication information. The third acquisition module may be further configured to save the second description information and the first authentication information based on the third configuration information after the first electronic apparatus is disconnected from the second electronic apparatus.

The first communication connection may be the communication connection that is established between the first electronic apparatus and the second electronic apparatus for the first time. The host control apparatus may represent the connection authentication that the second electronic apparatus can control the first electronic apparatus.

In some embodiments, the first acquisition unit 91 further includes a fourth acquisition module.

The fourth acquisition module may be configured to obtain fourth configuration information from the second electronic apparatus after a second communication connection is established with the second electronic apparatus. The fourth configuration information may at least include second authentication information.

The second authentication information may have a time limit. The fourth acquisition module may be further configured to at least delete the second authentication information after a first time period that the first electronic apparatus is disconnected from the second electronic apparatus.

In some embodiments, the device further includes a second processor.

The second processor may be configured to, after a third electronic apparatus established a temporary connection with the first electronic apparatus through the second authentication information, if fifth configuration information is obtained, monitor the communication state between the third electronic apparatus and the first electronic apparatus. After the third electronic apparatus is disconnected from the first electronic apparatus, the third electronic apparatus and the first electronic apparatus may delete or save the description information of each other. The fifth configuration information may include information on whether to set the third electronic apparatus as a common apparatus of the first electronic apparatus.

In some embodiments, the first acquisition unit 91 further includes a fifth acquisition module.

The fifth acquisition module may be configured to determine that sixth configuration information is included in the communication protocol corresponding to the communication connection after a communication connection is established with the second electronic apparatus. The sixth configuration information may at least include information for setting the communication connection to be a temporary connection. Thus, the fifth acquisition module may be further configured to delete the second description information corresponding to the second electronic apparatus based on the sixth configuration information after the first electronic apparatus is disconnected from the second electronic apparatus.

Embodiments of the present application further provide a communication device. The units included in the device, the modules included in the units, and components included in the modules may be implemented by the processor of the second electronic apparatus or by a specific logic circuit. In some embodiments, the processor may include a CPU, an MPU, a digital signal processor DSP, or an FPGA, etc.

Figure 9B:
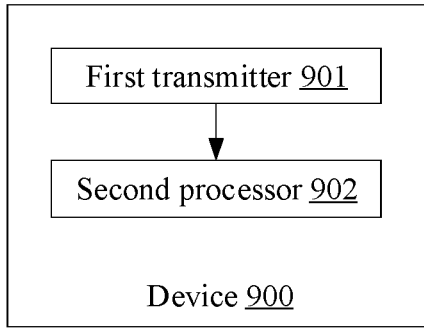
FIG. 9B illustrates a schematic structural diagram of another communication device according to some embodiments of the present disclosure.

FIG. 9B illustrates a schematic structural diagram of a communication device 900 according to some embodiments of the present disclosure. As shown in FIG. 9B, the device 900 includes a first transmitter 901 and a second processor 902.

The first transmitter 901 may be configured to send corresponding configuration information to the first electronic apparatus at least based on the obtained input operation after a communication connection is established with the first electronic apparatus.

The second processor 902 may be configured to monitor the communication state between the first electronic apparatus and the second electronic apparatus. After the first electronic apparatus is disconnected from the second electronic apparatus, the second processor 902 may be further configured to at least save or delete the first description information corresponding to the first electronic apparatus. The first description information may at least include information that represents the uniqueness of the first electronic apparatus.

In some embodiments, the first transmitter 901 includes a first transmission module.

The first transmission module may be configured to send the corresponding first configuration information to the first electronic apparatus based on the obtained first input operation after the first communication connection is established with the first electronic apparatus. The first configuration information may at least include information for setting the first communication connection as a temporary connection. Thus, after the second electronic apparatus is disconnected from the first electronic apparatus, the first description information corresponding to the first electronic apparatus may be deleted based on the first configuration information, or the first description information and the first configuration information may be deleted.

The first communication connection may be the communication connection that is established between the first electronic apparatus and the second electronic apparatus for the first time.

In some embodiments, the first transmitter 901 further includes a second transmission module.

The second transmission module may be configured to send the corresponding second configuration information to the first electronic apparatus based on the obtained second input operation after the first communication connection is established with the first electronic apparatus. The second configuration information may at least include information for setting the second electronic apparatus as a common apparatus of the first electronic apparatus and the corresponding first authentication information. Thus, after the second electronic apparatus is disconnected from the first electronic apparatus, based on the second configuration information, the first description information corresponding to the first electronic apparatus may be saved.

The first communication connection may be the communication connection that is established between the first electronic apparatus and the second electronic apparatus for the first time. The common apparatus may indicate that the first electronic apparatus may be detected by and/or connected to the second electronic apparatus.

In some embodiments, the first transmitter 901 includes a third transmission module.

The third transmission module may be configured to send corresponding third configuration information to the first electronic apparatus based on the obtained third input operation after the first communication connection is established with the first electronic apparatus. The third configuration information may at least include information for setting the second electronic apparatus as the host control apparatus of the first electronic apparatus and the corresponding first authentication information. Thus, the first description information corresponding to the first electronic apparatus may be saved based on the third configuration information after the second electronic apparatus is disconnected from the first electronic apparatus.

The first communication connection may be the communication connection that is established between the first electronic apparatus and the second electronic apparatus for the first time. The host control apparatus may represent the connection authentication that the second electronic apparatus may control the first electronic apparatus.

In some embodiments, the first transmitter 901 further includes a fourth transmission module.

The fourth transmission module may be configured to send corresponding fourth configuration information to the first electronic apparatus based on an obtained fourth input operation after the second communication connection is established with the first electronic apparatus. The fourth configuration information may at least include second authentication information;

The second authentication information may have a time limit. Thus, the second authentication information may be at least deleted after a first time period that the first electronic apparatus is disconnected from the second electronic apparatus.

In some embodiments, the second authentication information may be used to perform identity authentication on the third electronic apparatus when the first electronic apparatus establishes a temporary connection with the third electronic apparatus.

Correspondingly, the first authentication information may be used to perform identity authentication on the third electronic apparatus when the third electronic apparatus is set as the common apparatus of the first electronic apparatus.

In some embodiments, the first transmitter 901 further includes a fifth transmission module.

The fifth transmission module may be configured to, after the communication connection is established with the first electronic apparatus, add sixth configuration information to the communication protocol corresponding to the communication connection based on the obtained input operation and send the sixth configuration information to the first electronic apparatus. The sixth configuration information may at least include information for setting the communication connection as the temporary connection. Thus, the first description information corresponding to the first electronic apparatus may be deleted based on the sixth configuration information after the second electronic apparatus is disconnected from the first electronic apparatus.

The descriptions of the above apparatus embodiments are similar to the descriptions of the above method embodiments. Thus, beneficial effects may be included, similar to the beneficial effects of method embodiments. For technical details not disclosed in device embodiments of the present disclosure, reference may be made to the descriptions of method embodiments of the present disclosure.

In embodiments of the present disclosure, if the above communication method is implemented in the form of a software function module. When the communication method is sold or used as an independent product, the communication method may be saved in a computer-readable storage medium. Thus, the essence or the part that makes contributions to the existing technology of the technical solutions of the embodiments of the present application may be embodied in the form of software products. The computer software product may be stored in a storage medium and include several instructions to cause the electronic apparatus (i.e., a personal computer, a server, etc.) to execute all or part of the methods of embodiments of the present disclosure. The storage medium may include a U disk, a removable hard disk, a Read Only Memory (ROM), a magnetic disk, or an optical disk and other media that can store program codes. As such, embodiments of the present disclosure are not limited to any specific combination of hardware and software.

Correspondingly, embodiments of the present disclosure provide an electronic apparatus, including a memory and a processor. The memory stores a computer program that, when executed by the processor, causes the processor to implement the steps of the communication methods of embodiments of the present disclosure.

Correspondingly, embodiments of the present disclosure provide a readable storage medium, which stores a computer program. When the computer program is executed by the processor, the processor may implement the steps of the communication methods.

The descriptions of storage medium and device embodiments are similar to the descriptions method embodiments and have similar beneficial effects as method embodiments.

For technical details not disclosed in storage medium and device embodiments of the present disclosure, reference may be made to the description of method embodiments of the present disclosure.

Figure 10:
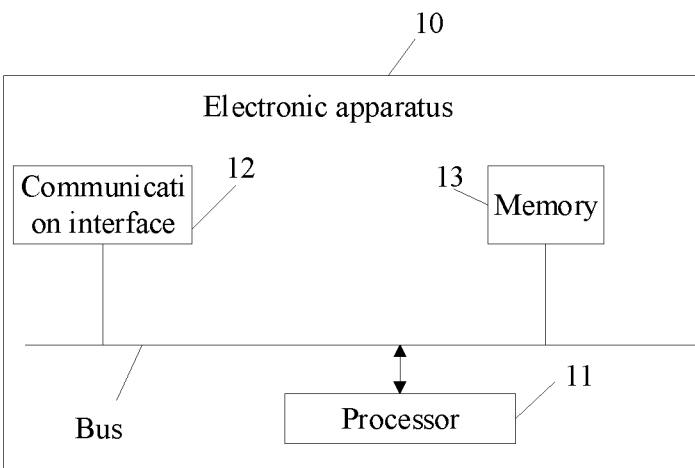
FIG. 10 illustrates a schematic diagram showing a hardware body of an electronic apparatus according to some embodiments of the present disclosure.

FIG. 10 illustrates a schematic diagram showing a hardware body of an electronic apparatus 10 according to some embodiments of the present disclosure. As shown in FIG. 10, the hardware of the electronic apparatus 10 includes a processor 11, a communication interface 12, and a memory 13.

The processor 11 may generally be configured to control the overall operation of the electronic apparatus 10.

The communication interface 12 may be configured to enable the electronic apparatus 10 to communicate with other electronic apparatuses or servers via a network.

The memory 13 may be used to store instructions and applications executable by the processor 11 and also cache data to be processed or processed by the processor 11 and the modules of the electronic apparatus 10 (e.g., image data, audio data, voice communication data, and video communication data). The memory 13 may include a flash memory (FLASH) or random access memory (RAM).

In some embodiments of the present disclosure, disclosed apparatus and method may be implemented in other manners. The device embodiments described above are merely illustrative. For example, the division of the units is only a logical functional division. In actual implementation, other division methods may be included. For example, multiple units or components may be combined or be integrated into another system, or some features can be ignored or not implemented. In addition, the coupling, or direct coupling, or communication connection between the various components shown or discussed may be through some interfaces. The indirect coupling or communication connection of apparatuses or units may be electrical, mechanical, or other forms.

The unit described above as a separate component may or may not be physically separated, and the component displayed as a unit may or may not be a physical unit. That is, the unit may be located in one place or distributed to multiple network units. Some or all of the units may be selected according to actual needs to achieve the purpose of the solution in embodiments of the present disclosure.

In addition, functional units of embodiments of the present disclosure may be integrated into one processing module, or each may be separately used as a unit, or two or more units may be integrated into one unit. The above integrated unit may be implemented either in the form of hardware or in the form of hardware and software functional units. Those of ordinary skill in the art can understand that all or part of the steps of implementing method embodiments may be completed by the program instructing the related hardware. The program may be stored in the computer-readable storage medium. When the program is executed, the steps of method embodiments may be implemented. The storage medium may include various media that can store program codes, such as a removable storage device, a ROM, a RAM, a magnetic disk, or an optical disk.

The methods disclosed in method embodiments of the present disclosure can be arbitrarily combined when there is no conflict to obtain new method embodiments.

The features disclosed in product embodiments of the present disclosure can be arbitrarily combined when there is no conflict to obtain new product embodiments.

The features disclosed in method or device embodiments of the present disclosure may be arbitrarily combined when there is no conflict to obtain new method embodiments or device embodiments.

Some embodiments of the present disclosure are described above. The scope of the present disclosure is not limited to this. Those skilled in the art may easily think of modifications or replacements in the technical scope of the present disclosure. These modifications and the replacements should be within the scope of the present disclosure. Therefore, the scope of the present invention should be subject to the scope of the claims.

What is claimed is:

1. A communication method applied to a first electronic apparatus, comprising:
after establishing a communication connection with a second electronic apparatus, obtaining configuration information from the second electronic apparatus;
monitoring a communication state between the first electronic apparatus and the second electronic apparatus; and
after the first electronic apparatus is disconnected from the second electronic apparatus, saving or deleting second description information corresponding to the second electronic apparatus based on the configuration information, the second description information including information representing uniqueness of the second electronic apparatus, the configuration information being configured for at least one of:
setting the communication connection to be a temporary connection;
setting the second electronic apparatus as a common apparatus of the first electronic apparatus, the common apparatus indicating that the first electronic apparatus is able to be detected and/or connected by the second electronic apparatus; or
setting the second electronic apparatus as a host control apparatus of the first electronic apparatus, the host control apparatus representing a connection authentication that the second electronic apparatus is able to control the first electronic apparatus;
wherein after establishing the communication connection with the second electronic apparatus, obtaining the configuration information from the second electronic apparatus includes:
after establishing a first communication connection with the second electronic apparatus, obtaining second configuration information and corresponding second description information from the second electronic apparatus, and saving the second description information and first authentication information based on the second configuration information after disconnecting from the second electronic apparatus, the second configuration information being configured for setting the second electronic apparatus as the common apparatus of the first electronic apparatus; or
after establishing the first communication connection with the second electronic apparatus, obtaining third configuration information and the corresponding second description information from the second electronic apparatus, and saving the second description information and the first authentication information based on the third configuration information after disconnecting from the second electronic apparatus, the third configuration information being configured for setting the second electronic apparatus as the host control apparatus of the first electronic apparatus and including the first authentication information; and
wherein the first communication connection is a communication connection that is established between the first electronic apparatus and the second electronic apparatus for a first time.

2. The method according to claim 1, wherein after establishing the communication connection with the second electronic apparatus, obtaining the configuration information from the second electronic apparatus further includes:
after establishing the first communication connection with the second electronic apparatus, obtaining first configuration information and the corresponding second description information from the second electronic apparatus, the first configuration information being configured for setting the first communication connection to be the temporary connection; and
deleting the second description information based on the first configuration information or deleting the second description information and the first configuration information after disconnecting from the second electronic apparatus.

3. The method according to claim 1, wherein after establishing the communication connection with the second electronic apparatus, obtaining the configuration information from the second electronic apparatus further includes:
after establishing a second communication connection with the second electronic apparatus, obtaining fourth configuration information from the second electronic apparatus, the fourth configuration information including second authentication information, and the second authentication information having a time limit; and
deleting the second authentication information after a first time period of disconnecting from the second electronic apparatus.

4. The method according to claim 3, further comprising:
after a third electronic apparatus establishes a temporary connection with the first electronic apparatus through the second authentication information, in response to obtaining fifth configuration information, monitoring a communication state between the third electronic apparatus and the first electronic apparatus, and
deleting or saving description information of each other after the third electronic apparatus is disconnected from the first electronic apparatus, the fifth configuration information including information of whether to set the third electronic apparatus as the common apparatus of the first electronic apparatus.

5. The method according to claim 1, wherein after establishing the communication connection with the second electronic apparatus, obtaining the configuration information from the second electronic apparatus further includes:
after establishing the communication connection with the second electronic apparatus, determining sixth configuration information included in a communication protocol corresponding to the communication connection, the sixth configuration information being configured for setting the communication connection as the temporary connection; and
after disconnecting from the second electronic apparatus, deleting the second description information corresponding to the second electronic apparatus based on the sixth configuration information.

6. A communication method applied to a second electronic apparatus, comprising:

after establishing a communication connection with a first electronic apparatus, sending corresponding configuration information to the first electronic apparatus based on an obtained input operation;

monitoring the communication state between the first electronic apparatus and the second electronic apparatus; and saving or deleting the first description information corresponding to the first electronic apparatus based on the configuration information, the first description information including information that represents uniqueness of the first electronic apparatus, and the configuration information being configured for at least one of:

setting the communication connection to be a temporary connection;

setting the second electronic apparatus as a common apparatus of the first electronic apparatus, the common apparatus indicating that the first electronic apparatus is able to be detected and/or connected by the second electronic apparatus; or setting the second electronic apparatus as a host control apparatus of the first electronic apparatus, the host control apparatus representing a connection authentication that the second electronic apparatus is able to control the first electronic apparatus;

wherein after establishing the communication connection with a first electronic apparatus, sending the corresponding configuration information to the first electronic apparatus based on the obtained input operation includes:

after establishing a first communication connection with the first electronic apparatus, sending second configuration information and corresponding second description information to the first electronic apparatus, and saving the first description information based on the second configuration information after disconnecting from the first electronic apparatus, the second configuration information being configured for setting the second electronic apparatus as the common apparatus of the first electronic apparatus; or after establishing the first communication connection with the first electronic apparatus, sending third configuration information and the corresponding second description information to the first electronic apparatus, and saving the first description information based on the third configuration information after disconnecting from the first electronic apparatus, the third configuration information being configured for setting the second electronic apparatus as the host control apparatus of the first electronic apparatus and including first authentication information; and wherein the first communication connection is a communication connection that is established between the first electronic apparatus and the second electronic apparatus for a first time.

7. The method according to claim 6, wherein after establishing the communication connection with the first electronic apparatus, sending the corresponding configuration information to the first electronic apparatus based on the obtained input operation further includes:

after establishing the communication connection with the first electronic apparatus, adding sixth configuration information to a communication protocol corresponding to the communication connection based on the obtained input operation;

sending the sixth configuration information to the first electronic apparatus, the sixth configuration information for setting the communication connection as the temporary connection; and deleting the first description information corresponding to the first electronic apparatus based on the sixth configuration information after disconnecting from the first electronic apparatus.

8. A communication system comprising a first electronic apparatus and a second electronic apparatus, wherein:

after the first electronic apparatus establishes a first communication connection with the second electronic apparatus, the second electronic apparatus sends second description information and at least one of second configuration information or third configuration information to the first electronic apparatus, the first electronic apparatus obtains the second description information and the at least one of the second configuration information or the third configuration information from the second electronic apparatus;

the first communication connection is a communication connection that is established between the first electronic apparatus and the second electronic apparatus for a first time;

the second configuration information includes information for setting the second electronic apparatus as a common apparatus of the first electronic apparatus and first authentication information, the common apparatus indicates that the first electronic apparatus is able to be detected and/or connected by the second electronic apparatus;

the third configuration information includes information for setting the second electronic apparatus as a host control apparatus of the first electronic apparatus and first authentication information, and the host control apparatus represents a connection authentication that the second electronic apparatus is able to control the first electronic apparatus;

after the first electronic apparatus is disconnected from the second electronic apparatus, the first electronic apparatus saves the second description information and the first authentication information based on the at least one of the second configuration or the third configuration information, and/or the second electronic apparatus saves first description information corresponding to the first electronic apparatus based on the at least one of the second configuration or the third configuration information;

the first description information includes information representing uniqueness of the first electronic apparatus; and the second description information includes information representing the uniqueness of the second electronic apparatus.

9. The communication system according to claim 8, wherein:

after the first communication connection is established with the second electronic apparatus, the first electronic apparatus further obtains first configuration information from the second electronic apparatus;

the first configuration information includes information for setting the first communication connection to be a temporary connection;

the first electronic apparatus deletes the second description information based on the first configuration information, or deletes the second description information and the first configuration information after disconnecting from the second electronic apparatus.

10. The communication system according to claim 8, wherein:

after the first communication connection is established with the second electronic apparatus, the first electronic apparatus obtains the second configuration information and the second description information from the second electronic apparatus; and the first electronic apparatus saves the second description information and the first authentication information based on the second configuration information after disconnecting from the second electronic apparatus.

11. The communication system according to claim 8, wherein:

after the first communication connection is established with the second electronic apparatus, the first electronic apparatus obtains the third configuration information and the second description information from the second electronic apparatus; and the first electronic apparatus saves the second description information and the first authentication information based on the third configuration information after disconnecting the first electronics apparatus from the second electronic apparatus.

12. The communication system according to claim 8, wherein:

after a second communication connection is established with the second electronic apparatus, the first electronic apparatus obtains fourth configuration information from the second electronic apparatus;

the fourth configuration information includes second authentication information, and the second authentication information has a time limit; and the first electronic apparatus deletes the second authentication information after a first time period of disconnecting from the second electronic apparatus.

13. The communication system according to claim 12, wherein:

after a third electronic apparatus establishes a temporary connection with the first electronic apparatus through the second authentication information, the first electronic apparatus obtains fifth configuration information and a communication state between the third electronic apparatus and the first electronic apparatus; and the third electronic apparatus and the first electronic apparatus delete or save description information of each other after the third electronic apparatus is disconnected from the first electronic apparatus; and the fifth configuration information includes information of whether to set the third electronic apparatus as the common apparatus of the first electronic apparatus.

14. The communication system according to claim 8, wherein:

after the first communication connection is established with the second electronic apparatus, the first electronic apparatus determines sixth configuration information included in a communication protocol corresponding to the first communication connection;

the sixth configuration information includes information for setting the communication connection as a temporary connection; and after disconnecting the first electronic apparatus from the second electronic apparatus, the first electronic apparatus deletes the second description information corresponding to the second electronic apparatus based on the sixth configuration information.

15. The communication system according to claim 8, wherein:

after the first communication connection is established with the first electronic apparatus, the second electronic apparatus sends the at least one of the second configuration information or the third configuration information to the first electronic apparatus based on an obtained input operation; and a communication state between the first electronic apparatus and the second electronic apparatus is monitored.

16. The communication system according to claim 15, wherein:

after the first communication connection is established with the first electronic apparatus, the second electronic apparatus adds sixth configuration information to a communication protocol corresponding to the first communication connection based on the obtained input operation;

the second electronic apparatus sends the sixth configuration information to the first electronic apparatus;

the sixth configuration information includes information for setting the communication connection as a temporary connection; and the second electronic apparatus deletes the first description information corresponding to the first electronic apparatus based on the sixth configuration information after disconnecting from the first electronic apparatus.

* * * * *